(12) United States Patent
Kim et al.

(10) Patent No.: US 11,481,000 B2
(45) Date of Patent: Oct. 25, 2022

(54) ELECTRONIC DEVICE INCLUDING PROTECTIVE STRUCTURE FOR PROTECTING FLEXIBLE DISPLAY

(71) Applicant: SAMSUNG ELECTRONICS CO., LTD., Suwon-si (KR)

(72) Inventors: Dooryong Kim, Suwon-si (KR); Doosun Yoon, Suwon-si (KR); Howon Lee, Suwon-si (KR); Inyoul Baek, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/204,307

(22) Filed: Mar. 17, 2021

(65) Prior Publication Data

US 2021/0294383 A1    Sep. 23, 2021

(30) Foreign Application Priority Data

Mar. 17, 2020  (KR) ........................ 10-2020-0032627

(51) Int. Cl.
*G06F 1/16*  (2006.01)
*H04M 1/02*  (2006.01)

(52) U.S. Cl.
CPC .......... *G06F 1/1641* (2013.01); *G06F 1/1652* (2013.01); *G06F 1/1681* (2013.01); *H04M 1/0268* (2013.01)

(58) Field of Classification Search
CPC .... G06F 1/1641; G06F 1/1652; G06F 1/1681; H04M 1/0268; H04M 1/185; H04M 1/022; H04M 1/026; H04M 1/0249
See application file for complete search history.

(56) References Cited

U.S. PATENT DOCUMENTS 7,797,795 B2  9/2010  Maatta et al.
9,229,481 B2  1/2016  Jinbo
(Continued)

FOREIGN PATENT DOCUMENTS

| CN | 208768115 | 4/2019 |
| KR | 10-2019-0001864 | 1/2019 |
| KR | 10-2019-0065641 | 6/2019 |

OTHER PUBLICATIONS

International Search Report dated Jul. 12, 2021 in corresponding International Application No. PCT/KR2021/003285.
(Continued)

*Primary Examiner* — Rockshana D Chowdhury
(74) *Attorney, Agent, or Firm* — Nixon & Vanderhye, P.C.

(57) ABSTRACT

An electronic device includes a housing structure including a first housing, a second housing, and a hinge housing, a hinge structure that is at least partially disposed in the hinge housing and that connects at least part of the first housing and at least part of the second housing to allow the first housing and the second housing to be folded or unfolded, with a folding axis therebetween, a display extending from the first housing to the second housing across the hinge housing, and a protective structure disposed at an edge of the hinge housing that faces a direction of the folding axis. The protective structure includes a fixed part disposed in the hinge housing, guide parts disposed in the first housing and the second housing, respectively, and moving parts including cover portions that cover at least parts of a periphery of the display. The moving parts are configured to be movable relative to the guide parts and the fixed part such that a gap between a surface of the display and the cover portions is changed.

20 Claims, 18 Drawing Sheets

(56) References Cited

U.S. PATENT DOCUMENTS

| | | | |
|---|---|---|---|
| 9,348,450 B1 | 5/2016 | Kim | |
| 9,952,626 B2 | 4/2018 | Jinbo | |
| 10,423,019 B1 | 9/2019 | Song | |
| 10,754,377 B2 | 8/2020 | Siddiqui | |
| 10,912,214 B2 * | 2/2021 | Kang | H05K 5/03 |
| 11,194,366 B2 * | 12/2021 | Cheng | G06F 1/1652 |
| 11,243,578 B2 * | 2/2022 | Torres | G06F 1/1616 |
| 2006/0278234 A1 | 12/2006 | Maatta et al. | |
| 2015/0177789 A1 | 6/2015 | Jinbo | |
| 2016/0295709 A1 * | 10/2016 | Ahn | G06F 1/1652 |
| 2018/0292860 A1 | 10/2018 | Siddiqui | |
| 2021/0034117 A1 * | 2/2021 | Torres | G06F 1/1616 |

OTHER PUBLICATIONS

Extended Search Report dated Mar. 24, 2022 in counterpart European Patent Application No. 21755890.7.

* cited by examiner

ELECTRONIC DEVICE INCLUDING PROTECTIVE STRUCTURE FOR PROTECTING FLEXIBLE DISPLAY

CROSS-REFERENCE TO RELATED APPLICATION(S)

This application is based on and claims priority under 35 U.S.C. § 119 to Korean Patent Application No. 10-2020-0032627, filed on Mar. 17, 2020, in the Korean Intellectual Property Office, the disclosure of which is incorporated by reference herein its entirety.

BACKGROUND

1. Field

The disclosure relates to an electronic device including a protective structure for protecting a flexible display.

2. Description of Related Art

An electronic device (e.g., a smartphone) may include a display for displaying a screen. Furthermore, a flexible display may be applied to the electronic device to achieve a large screen.

The flexible display may be disposed such that at least a portion thereof is folded. The folding portion of the flexible display may have a high risk of damage, compared to other portions of the flexible display.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including a protective structure for preventing damage to a flexible display.

Another aspect of the disclosure is to provide an electronic device including a protective structure for protecting a vulnerable portion at an edge of a folding area of a flexible display.

In accordance with an aspect of the disclosure, an electronic device includes a housing structure including a first housing, a second housing, and a hinge housing, a hinge structure that is at least partially disposed in the hinge housing and that connects at least part of the first housing and at least part of the second housing to allow the first housing and the second housing to be folded or unfolded, with a folding axis therebetween, a display extending from the first housing to the second housing across the hinge housing, and a protective structure disposed at an edge of the hinge housing that faces a direction of the folding axis. The protective structure includes a fixed part disposed in the hinge housing, guide parts disposed in the first housing and the second housing, respectively, and moving parts including cover portions that cover at least parts of a periphery of the display. The moving parts are configured to be movable relative to the guide parts and the fixed part such that a gap between a surface of the display and the cover portions is changed.

In accordance with another aspect of the disclosure, an electronic device includes a housing structure including a first housing, a second housing, and a hinge housing, a hinge structure that is at least partially disposed in the hinge housing and that connects the first housing and the second housing to allow the first housing and the second housing to be folded or unfolded, with a folding axis therebetween, a display that extends from the first housing to the second housing across the hinge housing and that includes a first area formed to be flat and disposed in at least part of the first housing, a second area formed to be flat and disposed in at least part of the second housing, and a folding area formed to be flat or curved and disposed in at least part of the hinge housing, and a protective structure located at an edge of the hinge housing that faces a direction of the folding axis, the protective structure including moving parts including cover portions that cover at least parts of an edge of the folding area of the display that faces a direction of the folding axis, a fixed part that is at least partially disposed in the hinge housing and that supports movements of the moving parts, and guide parts that are disposed in the first housing and the second housing, respectively, and that guide the movements of the moving parts. The electronic device includes a flat state in which the folding area is flat and a folded state in which the folding area is curved, and the moving parts are configured to be movable such that the cover portions move away from the folding axis and move toward a surface of the folding area when the electronic device moves from the flat state to the folded state.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

With regard to description of the drawings, identical or similar reference numerals may be used to refer to identical or similar components.

DETAILED DESCRIPTION

Hereinafter, various embodiments of the disclosure will be described with reference to the accompanying drawings. However, those of ordinary skill in the art will recognize that modifications, equivalents, and/or alternatives on the various embodiments described herein can be variously made without departing from the scope and spirit of the disclosure.

Figure 1A:
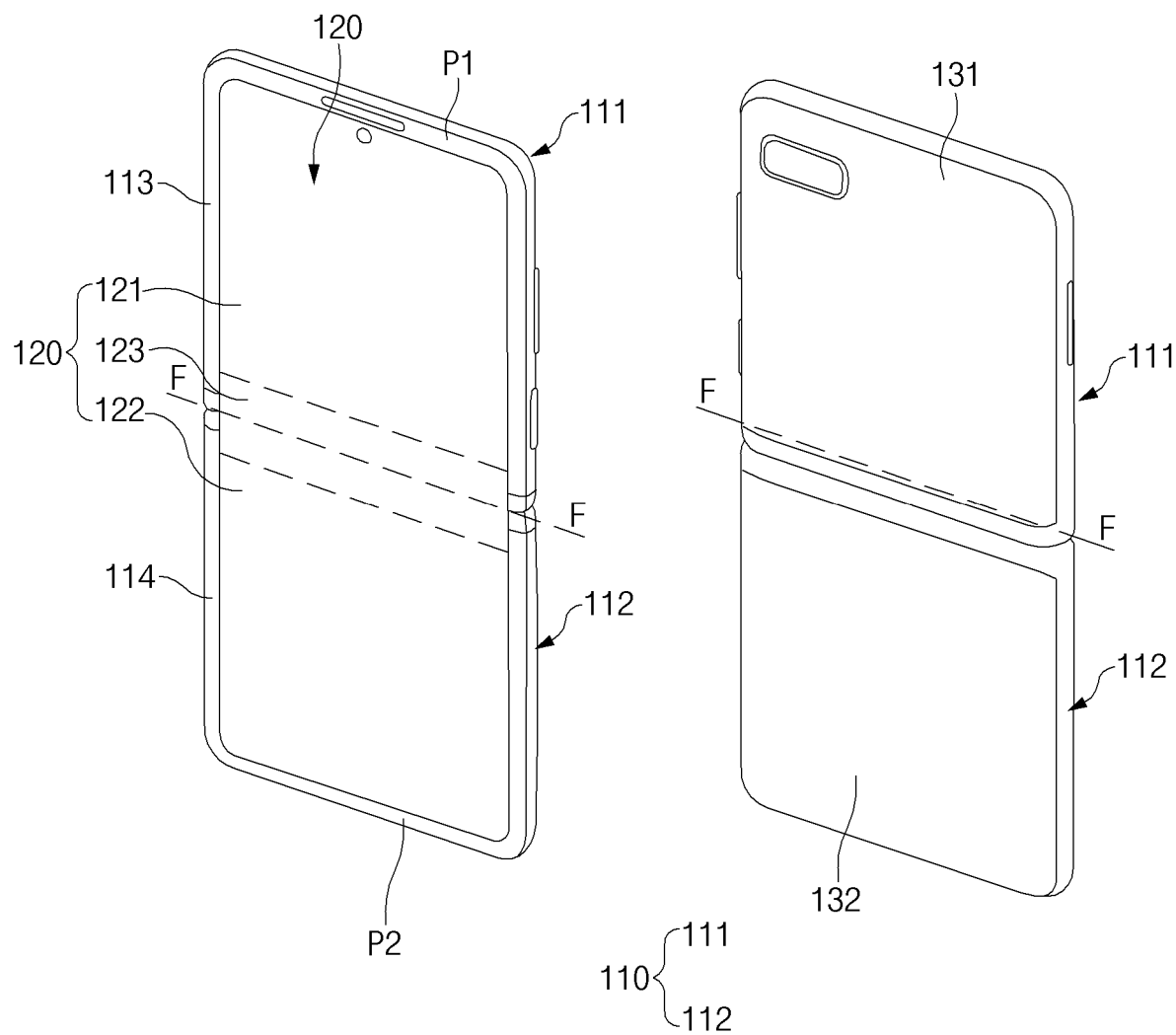
FIG. 1A is a view illustrating a flat state of an electronic device according to an embodiment.
Figure 1B:
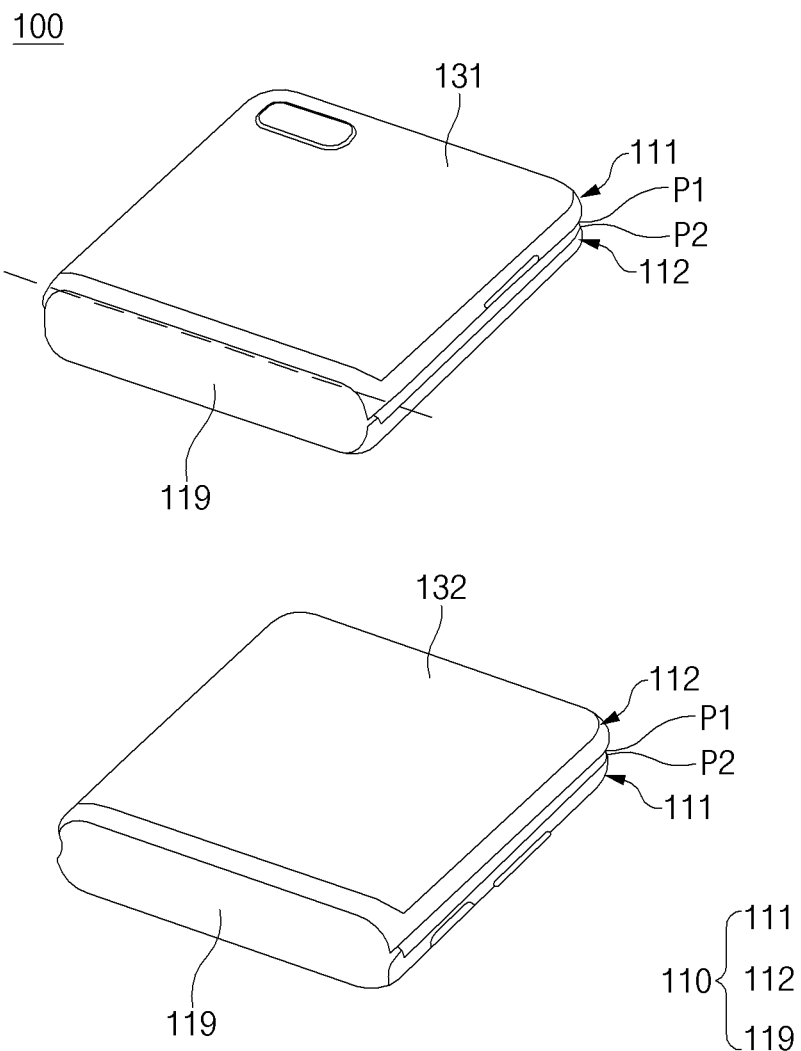
FIG. 1B is a view illustrating a folded state of the electronic device according to an embodiment.
Figure 1C:
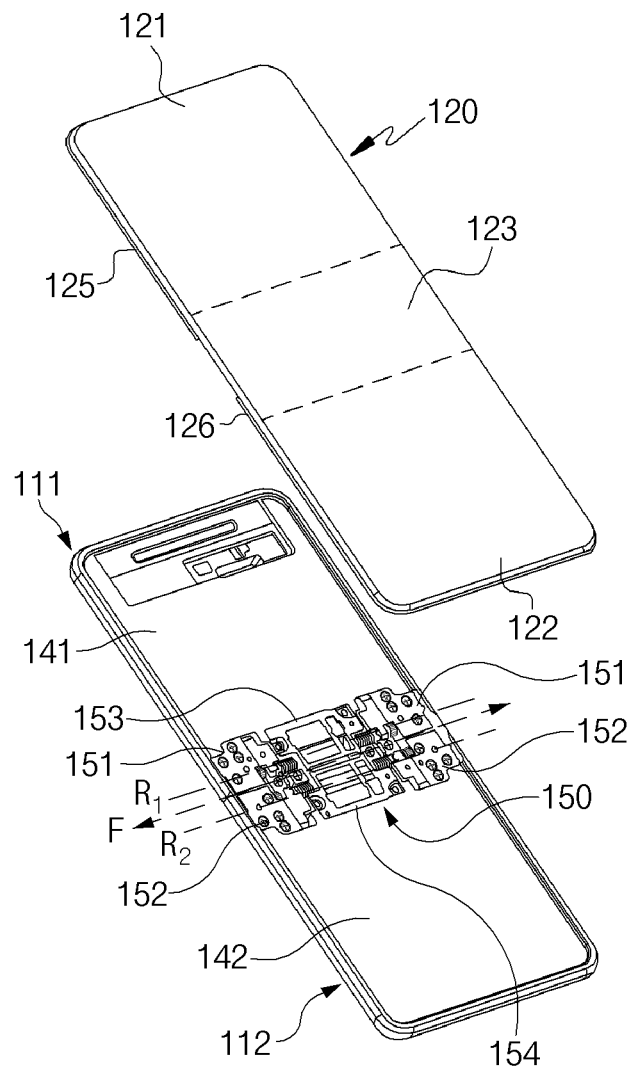
FIG. 1C is an exploded perspective view of the electronic device according to an embodiment.

FIG. 1A is a view illustrating a flat state of an electronic device according to an embodiment. FIG. 1B is a view illustrating a folded state of the electronic device according to an embodiment. FIG. 1C is an exploded perspective view of the electronic device according to an embodiment.

Referring to FIGS. 1A and 1B, the electronic device 100 according to an embodiment may include a foldable housing 110 (or, a housing structure) that includes a first housing 111 and a second housing 112, a flexible display 120, a hinge structure 150 (refer to FIG. 1C), and covers 131 and 132 (or, "back covers").

According to an embodiment, the first housing 111 and the second housing 112 may form a space in which electronic parts (e.g., a printed circuit board, a battery, a processor, and the like) of the electronic device 100 are disposed. The first housing 111 and the second housing 112 may form side surfaces of the electronic device 100. For example, various types of parts for performing various functions of the electronic device 100 may be disposed in the first housing 111 and the second housing 112. For example, electronic parts, such as a front camera, a receiver, a sensor (e.g., a proximity sensor), and the like, may be disposed in the first housing 111 and the second housing 112. Although not illustrated in the drawings, the aforementioned electronic parts may be exposed on a front surface of the electronic device 100 through at least one opening or recess provided on the flexible display 120.

In an embodiment, the first housing 111 and the second housing 112 may be disposed side by side when the electronic device 100 is in the flat state. In another embodiment, when the electronic device 100 is in the folded state, the first housing 111 and the second housing 112 may be disposed such that one surface of the first housing 111 and one surface of the second housing 112 face each other by rotation of the first housing 111 and the second housing 112 about a folding axis F.

In an embodiment, the hinge structure 150 may be connected with at least part of the first housing 111 and at least part of the second housing 112 to allow the first housing 111 and the second housing 112 to be folded or unfolded with the folding axis F therebetween.

According to an embodiment, the flexible display 120 may form one surface of the first housing 111 and one surface of the second housing 112. To support the flexible display 120, the first housing 111 and the second housing 112 may be formed of a metallic material and/or a non-metallic material that has a specified stiffness. In an embodiment, the flexible display 120 may form the front surface of the electronic device 100 when the electronic device 100 is in the flat state.

In an embodiment, the flexible display 120 may include a first area 121 corresponding to at least one area of the first housing 111, a second area 122 corresponding to at least one area of the second housing 112, and a folding area 123 located between the first area 121 and the second area 122.

In an embodiment, when the electronic device 100 is in the flat state, the first area 121, the folding area 123, and the second area 122 may be disposed side by side while facing the same direction. When the electronic device 100 is in the folded state, the first area 121 and the second 122 may face each other, with the folding area 123 bent.

According to an embodiment, at least one area (e.g., the first area 121 and the second area 122) of the flexible display 120 may be fixed to one surface of the first housing 111 and one surface of the second housing 112.

In an embodiment, the covers 131 and 132 may be located at lower ends of the first housing 111 and the second housing 112 and may form a rear surface of the electronic device 100. For example, the covers 131 and 132 may include a first cover 131 coupled to the first housing 111 and a second cover 132 coupled to the second housing 112. In another example, the first cover 131 and the first housing 111 may be integrally formed with each other, and the second cover 132 and the second housing 112 may be integrally formed with each other.

In an embodiment, a first edge P1 parallel to the folding axis F among edges of the first housing 111 may be defined. A second edge P2 parallel to the folding axis F among edges of the second housing 112 may be defined. In various embodiments, the folded state of the electronic device 100 may include a fully-folded state (e.g., FIG. 1B) in which the first edge P1 and the second edge P2 meet each other.

Referring to FIG. 1C, the first housing 111 may include a first support plate 141. Part of the flexible display 120 may be disposed on the first support plate 141. For example, the first area 121 may be attached to the first support plate 141. For example, a first metal plate 125 may be attached to the first support plate 141.

In an embodiment, the second housing 112 may include a second support plate 142. Part of the flexible display 120 may be disposed on the second support plate 142. For example, the second area 122 may be attached to the second support plate 142. For example, a second metal plate 126 may be attached to the second support plate 142.

Referring to FIG. 1C, the electronic device 100 may include the hinge structure 150 that is connected to the first housing 111 and the second housing 112. In an embodiment, the hinge structure 150 may connect the first housing 111 and the second housing 112 to allow the first housing 111 and the second housing 112 to be folded with the folding axis F therebetween. In an embodiment, at least part of the hinge structure 150 may be disposed in a hinge housing 119.

In an embodiment, the hinge structure 150 may include a first axis of rotation R1, a second axis of rotation R2, a first rotary part 151, and a second rotary part 152.

In an embodiment, the first rotary part 151 may be configured to rotate about the first axis of rotation R1. The first rotary part 151 may be connected to the first support plate 141 of the first housing 111. For example, the first rotary part 151 may be fastened to the first support plate 141 by rivets. In an embodiment, the second rotary part 152 may be configured to rotate about the second axis of rotation R2. The second rotary part 152 may be connected to the second support plate 142 of the second housing 112. For example, the second rotary part 152 may be fastened to the second support plate 142 by rivets. In an embodiment, the first axis of rotation R1 and the second axis of rotation R2 may be located to be substantially symmetric to each other with respect to the folding axis F.

Accordingly, when the electronic device 100 is folded or unfolded, the first housing 111, together with the first rotary part 151, may rotate about the first axis of rotation R1 by a predetermined angle, and the second housing 112, together with the second rotary part 152, may rotate about the second axis of rotation R2 by a predetermined angle. As the first housing 111 and the second housing 112 rotate about the first axis of rotation R1 and the second axis of rotation R2, respectively, the first housing 111 and the second housing 112 may be folded with the folding axis F therebetween.

In an embodiment, the hinge structure 150 may further include a first support part 153 and a second support part 154 that support a rear surface of the flexible display 120. For example, the first support part 153 may support at least part of a rear surface of the first area 121 of the flexible display 120. For example, the second support part 154 may support at least part of a rear surface of the second area 122 of the flexible display 120.

In an embodiment, the flexible display 120 may further include the metal plates 125 and 126 disposed on the rear surface thereof. In an embodiment, the metal plates 125 and 126 may include the first metal plate 125 disposed on the rear surface of the first area 121 and part of a rear surface of the folding area 123, and the second metal plate 126 disposed on the rear surface of the second area 122 and part of the rear surface of the folding area 123.

In an embodiment, the first metal plate 125 and the second metal plate 126 may contain a metallic material having a predetermined stiffness.

In an embodiment, the first metal plate 125 may be attached to at least part of the first area 121 and may extend toward the folding area 123. The second metal plate 126 may be attached to at least part of the second area 122 and may extend toward the folding area 123. For example, the first metal plate 125 and the second metal plate 126 may not be attached to the folding area 123. Accordingly, in the flat state, the first metal plate 125 and the second metal plate 126 may support the folding area 123 to allow the folding area 123 to remain flat. In the folded state, the first metal plate 125 and the second metal plate 126 may be separated from the folding area 123 and may remain substantially flat. For example, in the folded state, the first metal plate 125 and the second metal plate 126 may extend in the direction of tangential surfaces of the folding area 123 that is curved.

Figure 2A:
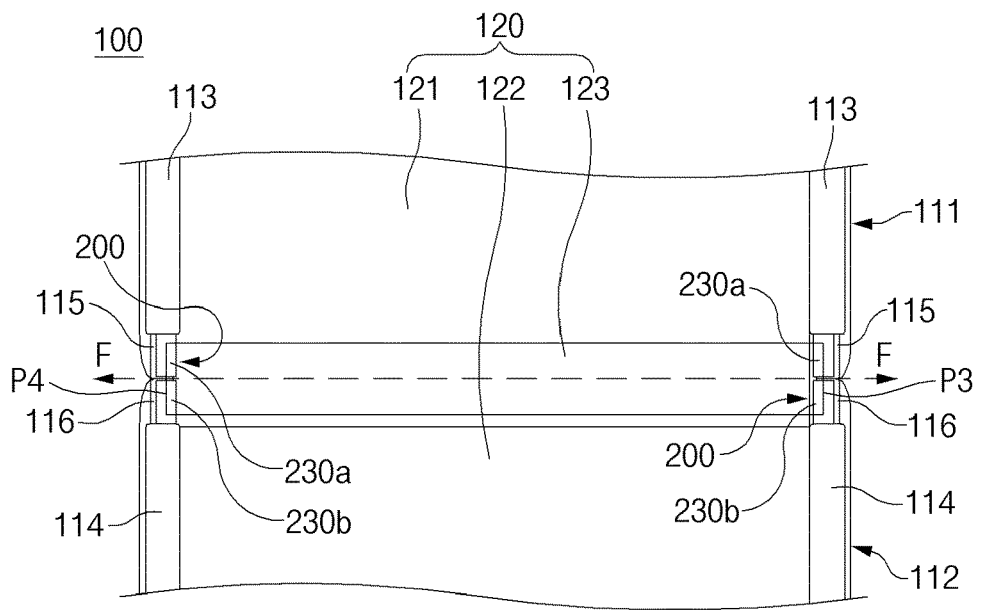
FIGS. 2A and 2B are views illustrating the electronic device according to an embodiment.
Figure 2B:
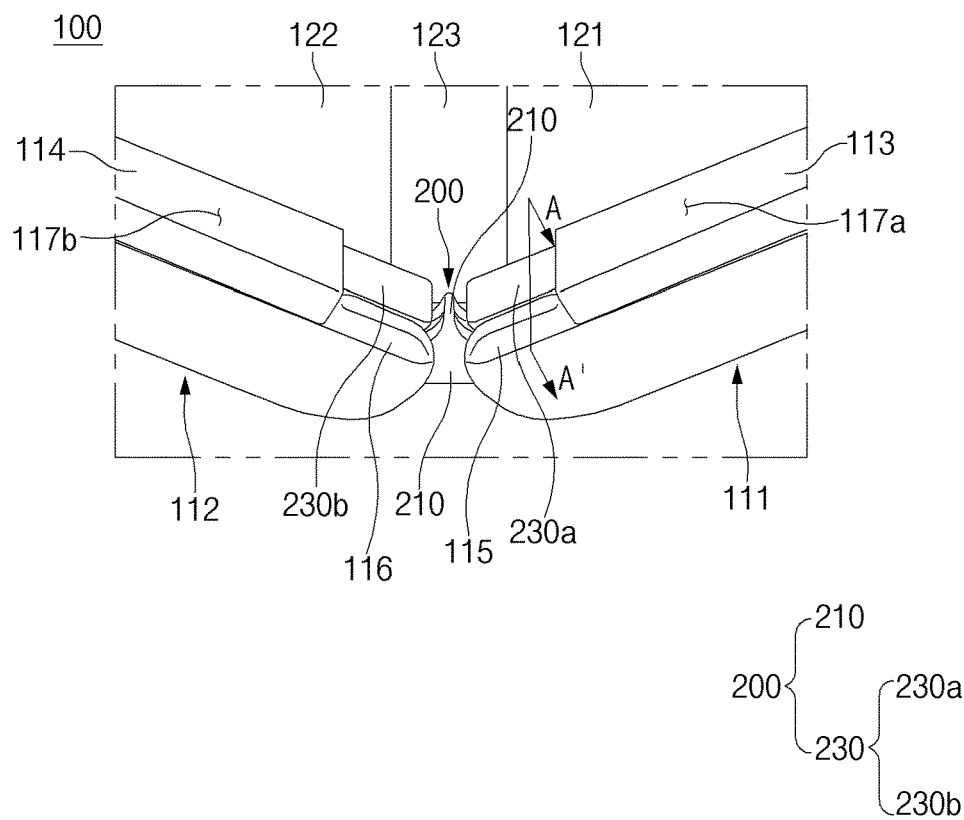

FIGS. 2A and 2B are views illustrating the electronic device according to an embodiment. FIG. 2A is a view illustrating protective structures in a flat state of the electronic device. FIG. 2B is a view illustrating the protective structures in a folded state of the electronic device.

In an embodiment, the electronic device 100 may include the flexible display 120 and the protective structures 200 for protecting edges P3 and P4 of the folding area 123 of the flexible display 120.

In an embodiment, each of the protective structures 200 may include a fixed part 210 fixed to the hinge housing 119 and moving parts 230 coupled to the fixed part 210 so as to be movable. In the illustrated embodiment, the moving parts 230 may include a first moving part 230a adjacent to a first decorative member 113 and a second moving part 230b adjacent to a second decorative member 114.

In an embodiment, opposite edges of the folding area 123 in the direction of the folding axis F may be defined as the third edge P3 and the fourth edge P4. The third edge P3 and the fourth edge P4 may extend in a direction perpendicular to the folding axis F and may be parallel to each other.

In an embodiment, each of the third edge P3 and the fourth edge P4 of the folding area 123 may be covered by at least parts of the moving parts 230 of the protective structure 200. For example, when the flexible display 120 is viewed from above, each of the third edge P3 and the fourth edge P4 may overlap the moving parts 230 of the protective structure 200. Accordingly, the protective structure 200 may prevent direct application of external impact to the folding area 123.

In an embodiment, the first housing 111 may include the first decorative member 113 covering at least part of the periphery of the first area 121 of the flexible display 120 and a first screen wall 115 facing the first moving part 230a of the protective structure 200. For example, when the flexible display 120 is viewed from above, the first decorative member 113 may overlap at least part of the periphery of the first area 121. In various embodiments, the first decorative member 113 may be integrally formed with the first housing 111, or may be coupled to the first housing 111 so as to be removable. For example, the first decorative member 113 may extend from the first housing 111 so as to cover part of a surface of the first area 121. In an embodiment, when the electronic device 100 is viewed from a side, the first screen wall 115 may be formed to hide at least part of the first moving part 230a.

In an embodiment, the second housing 112 may include the second decorative member 114 covering at least part of the periphery of the second area 122 of the flexible display 122 and a second screen wall 116 facing the second moving part 230b of the protective structure 200. For example, when the flexible display 120 is viewed from above, the second decorative member 114 may overlap at least part of the periphery of the second area 122. In various embodiments, the second decorative member 114 may be integrally formed with the second housing 112, or may be coupled to the second housing 112 so as to be removable. For example, the second decorative member 114 may extend from the second housing 112 so as to cover part of a surface of the second area 122. In an embodiment, when the electronic device 100 is viewed from a side, the second screen wall 116 may be formed to hide at least part of the second moving part 230b.

Referring to FIGS. 2A and 2B, as the electronic device 100 moves from the flat state to the folded state, the area of the fixed part 210 exposed between the first moving part 230a and the second moving part 230b of the protective structure 200 may increase.

In various embodiments, as the electronic device 100 moves from the flat state to the folded state, the moving parts 230 may move in a direction away from the folding axis F and in a direction toward a surface of the folding area 123 of the flexible display 120. When the electronic device 100 is folded or unfolded, the moving parts 230 may move along predetermined paths so as not to overlap a trajectory along which the folding area 123 of the flexible display 120 is deformed.

In various embodiments, when the electronic device 100 moves from the flat state to the folded state, the first moving part 230a may move such that at least part thereof overlaps the first decorative member 113. For example, in the folded state, at least part of the first moving part 230a may be received in a first receiving space 117a between the first decorative member 113 and a surface of the flexible display 120. For example, as the electronic device 100 is folded to a greater degree (e.g., as the folding area 123 is deformed with a greater curvature), the first moving part 230a may be further received in the space.

In various embodiments, when the electronic device 100 moves from the flat state to the folded state, the second moving part 230b may move such that at least part thereof overlaps the second decorative member 114. For example, in the folded state, at least part of the second moving part 230b may be received in a second receiving space 117b between the second decorative member 114 and the surface of the flexible display 120. For example, as the electronic device 100 is folded to a greater degree (e.g., as the folding area 123 is deformed with a greater curvature), the second moving part 230b may be further received in the space.

Figure 3A:
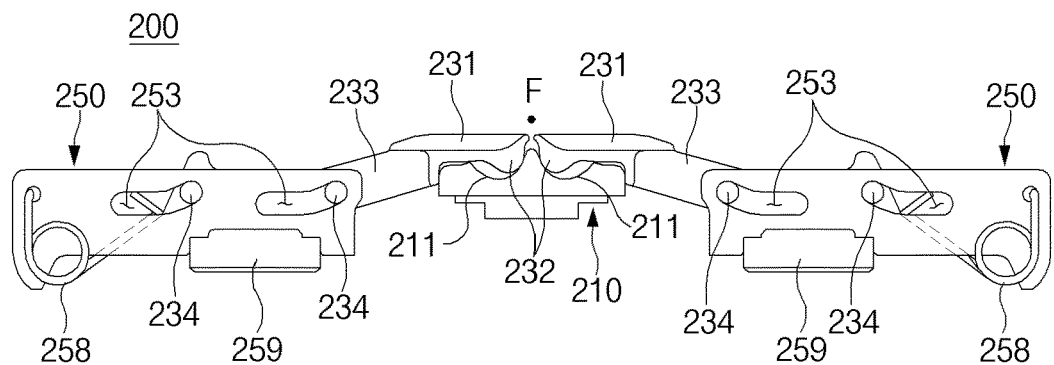
FIGS. 3A, 3B, and 3C are views illustrating the electronic device and a protective structure according to an embodiment.
Figure 3B:
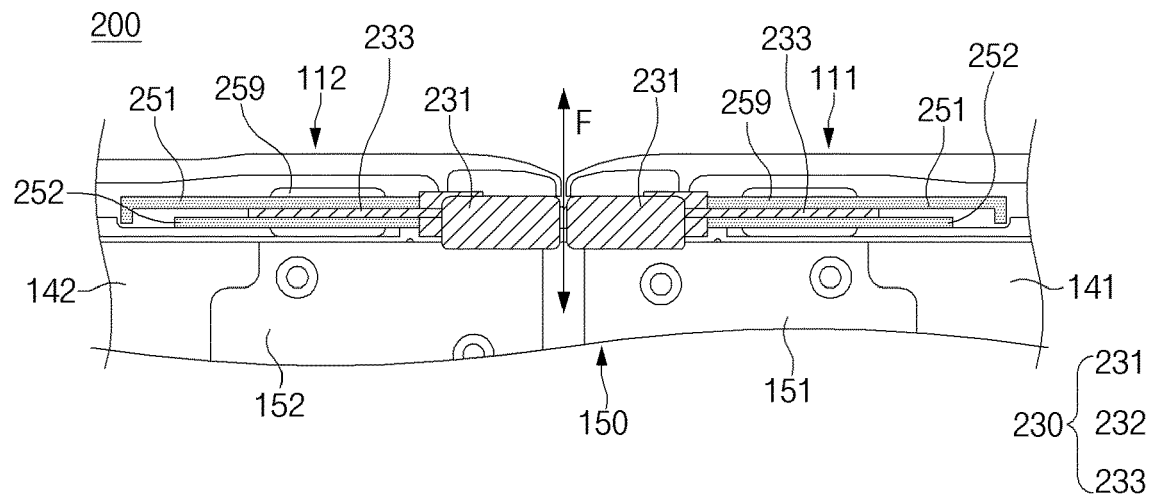
Figure 3C:
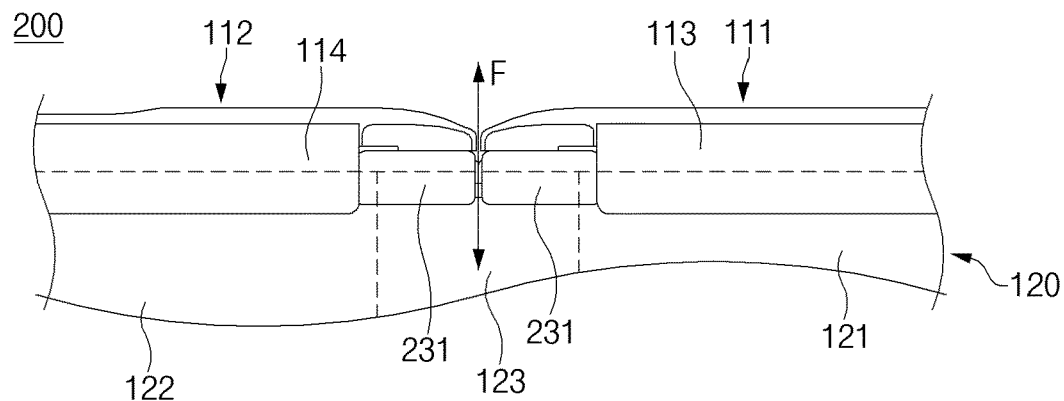

FIGS. 3A, 3B, and 3C are views illustrating the electronic device and the protective structure according to an embodiment. FIG. 3A is a view illustrating the protective structure. FIG. 3B is a view illustrating the electronic device including the protective structure. FIG. 3C is a plan view illustrating the flexible display and the decorative members. FIG. 3B is a view in which the flexible display is omitted from FIG. 3C.

Referring to FIGS. 3A, 3B, and 3C, the protective structure 200 may include the fixed part 210 fixed to the electronic device 100, the moving parts 230 connected to the fixed part 210 so as to be movable relative to the fixed part 210, and guide parts 250 that guide movements of the moving parts 230.

In an embodiment, at least part of the fixed part 210 may be fixed to the inside of the hinge housing 119. The fixed part 210 may include rails 211 in which at least parts of support portions 232 of the moving parts 230 are received. In various embodiments, the rails 211 may include two or more rails having different curvatures. In an embodiment, the fixed part 210 may press the moving parts 230 such that the moving parts 230 move when the electronic device 100 is folded or unfolded.

In an embodiment, the guide parts 250 may include first holders 259 fixed to the first housing 111 and the second housing 112, respectively, and first portions 251 and second portions 252 that are connected to the first holders 259 and face each other. In various embodiments, the first portions 251 and the second portions 252 may include flat areas facing each other. In an embodiment, the guide parts 250 may include guide grooves 253 formed in the first portions 251 and/or the second portions 252. Guide protrusions 234 of connecting portions 233 may be received in the guide grooves 253. As many guide grooves 253 as the guide protrusions 234 may be formed. In an embodiment, the guide grooves 253 may substantially form travel paths of the moving parts 230. In an embodiment, the guide grooves 253 may extend in predetermined directions obtained by synthesizing directions away from the folding axis F (e.g., left and right directions with respect to the drawings) and a direction toward the first holders 259 (e.g., a lower direction with respect to the drawings). In various embodiments, the guide grooves 253 may include curved sections.

In embodiments, the moving parts 230 may include cover portions 231 configured to cover an edge (e.g., the third edge P3 or the fourth edge P4 of FIG. 2A) of the folding area 123, the support portions 232 extending from the cover portions 231 toward the fixed part 210, and the connecting portions 233 that extend from the cover portions 231 and that are coupled to the guide parts 250 so as to be movable. In an embodiment, the cover portions 231 may extend in the direction of the folding axis F to cover the edge of the folding area 123.

In an embodiment, the support portions 232 may include protruding portions formed to be received in the rails 211 of the fixed part 210. When the electronic device 100 moves from the flat state to the folded state, forces may be applied from the fixed part 210, which is fixed to the electronic device 100, to the support portions 232 of the moving parts 230 in directions away from the folding axis F.

In an embodiment, the connecting portions 233 may extend into spaces between the first portions 251 and the second portions 252 of the guide parts 250. The connecting portions 233 may include the guide protrusions 234 received in the guide grooves 253 of the guide parts 250. For example, two or more guide protrusions 234 may be formed. The guide protrusions 234 may guide movements of the moving parts 230 in the state of being received in the guide grooves 253.

In an embodiment, the guide parts 250 may further include elastic members 258. The elastic members 258 may connect the guide parts 250 and the moving parts 230. For example, the elastic members 258 may be supported on the guide parts 250 and may be configured to apply elastic forces to the moving parts 230. The elastic members 258 may be fixed by the guide parts 250. As will be described below, the elastic forces of the elastic members 258 may be applied to the connecting portions 233 of the moving parts 230 when the electronic device 100 moves from the folded state to the flat state. The elastic forces may be directed toward the folding axis F.

In various embodiments, the elastic members 258 may be in equilibrium when the electronic device 100 is in the flat state and may be in a compressed state when the electronic device 100 is in the folded state. In various embodiments, the elastic members 258 may include torsion springs.

Referring to FIGS. 3B and 3C, the first housing 111 may include the first decorative member 113 covering at least part of the periphery of the flexible display 120. For example, the first decorative member 113 may be coupled to the first housing 111, or may extend from the first housing 111, so as to cover the periphery of the first area 121 of the flexible display 120. For example, the first decorative member 113 may be coupled to the first housing 111 so as to be removable, or may be integrally formed with the first housing 111.

Referring to FIGS. 3B and 3C, the second housing 112 may include the second decorative member 114 covering at least part of the periphery of the flexible display 120. For example, the second decorative member 114 may be coupled to the second housing 112, or may extend from the second housing 112, so as to cover the periphery of the second area 122 of the flexible display 120. For example, the second decorative member 114 may be coupled to the second housing 112 so as to be removable, or may be integrally formed with the second housing 112.

In an embodiment, in the flat state, at least part of a first protective structure 200a may overlap the first decorative member 113 when the flexible display 120 is viewed from above. For example, in the flat state, the first decorative member 113 may cover the guide part 250 of the first protective structure 200a, the connecting portion 233 of the moving part 230 of the first protective structure 200a, and part of the cover portion 231 of the moving part 230 of the first protective structure 200a.

In an embodiment, in the flat state, at least part of a second protective structure 200b may overlap the second decorative member 114 when the flexible display 120 is viewed from above. For example, in the flat state, the second decorative member 114 may cover the guide part 250 of the second protective structure 200b, the connecting portion 233 of the moving part 230 of the second protective structure 200b, and part of the cover portion 231 of the moving part 230 of the second protective structure 200b.

In an embodiment, when the electronic device 100 is in the flat state, the first decorative member 113, the second decorative member 114, and the cover portions 231 of the protective structures 200 may protect the periphery of the flexible display 120.

In an embodiment, the first rotary part 151 of the hinge structure 150 may be connected to the first support plate 141 of the first housing 111 so as to rotate together with the first housing 111. When the first housing 111 is folded about the folding axis F, the first rotary part 151 of the hinge structure 150 may rotate about an axis of rotation (e.g., the first axis of rotation R1 of FIG. 1C) that is parallel to the folding axis F, and the moving part 230 of the first protective structure 200a may move in a direction away from the folding axis F. For example, the cover portion 231 of the moving part 230 of the first protective structure 200a may be received under the first decorative member 113. For example, the guide protrusions 234 of the moving part 230 of the first protective structure 200a may move along the guide grooves 253 of the guide part 250 of the first protective structure 200a.

In an embodiment, the second rotary part 152 of the hinge structure 150 may be connected to the second support plate 142 of the second housing 112 so as to rotate together with the second housing 112. When the second housing 112 is folded about the folding axis F, the second rotary part 152 of the hinge structure 150 may rotate about an axis of rotation (e.g., the second axis of rotation R2 of FIG. 1C) that is parallel to the folding axis F, and the moving part 230 of the second protective structure 200b may move in a direction away from the folding axis F. For example, the cover portion 231 of the moving part 230 of the second protective structure 200b may be received under the second decorative member 114. For example, the guide protrusions 234 of the moving part 230 of the second protective structure 200b may move along the guide grooves 253 of the guide part 250 of the second protective structure 200b.

Figure 4:
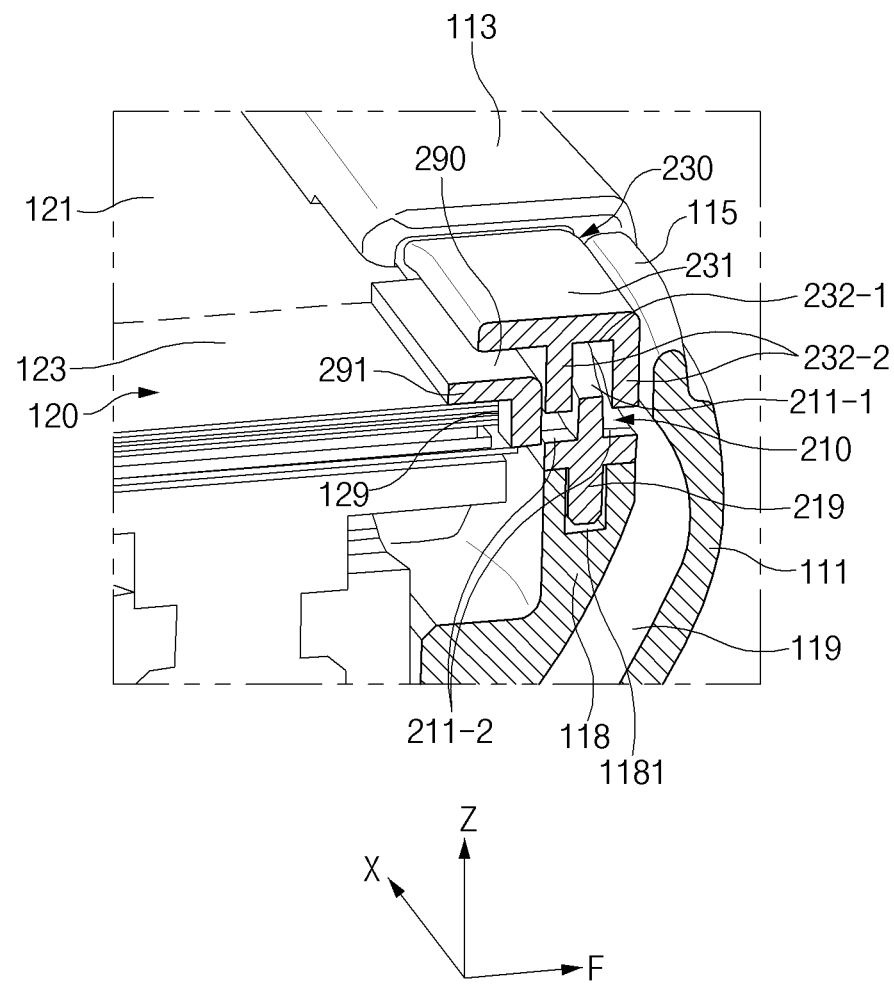
FIG. 4 is a sectional perspective view of the electronic device according to an embodiment.

FIG. 4 is a sectional perspective view of the electronic device according to an embodiment. FIG. 4 is a sectional perspective view taken along line A-A' of FIG. 2B. Although FIG. 4 illustrates the first housing 111, the first decorative member 113, and the first area 121 of the flexible display 120, the following description may be applied to the second housing 112, the second decorative member 114, and the second area 122 of the flexible display 120.

Referring to FIG. 4, the flexible display 120 may be disposed such that at least part of the periphery of the first area 121 is covered by the first decorative member 113 and at least parts of the edge of the folding area 123 are covered by the cover portions 231 of the moving parts 230.

Referring to FIG. 4, a protective member 290 may be disposed at the edge of the folding area 123 of the flexible display 120 that faces the direction of the folding axis F. The protective member 290 may be formed of a flexible material to correspond to bending of the folding area 123. For example, the protective member 290 may contain rubber. In the illustrated embodiment, a first portion 291 of the protective member 290 may be located on the surface of the folding area 123, and the protective member 290 may extend from the first portion 291 toward the inside of the first housing 111 to surround an end surface 129 (e.g., a surface facing the direction of the folding axis F) of the folding area 123. For example, the first portion 291 of the protective member 290 may be located between the cover portions 231 of the moving parts 230 and the folding area 123.

In an embodiment, when the electronic device 100 moves to a folded state, the protective member 290 may prevent damage to the folding area 123 that is likely to occur when the cover portions 231 move toward the surface of the folding area 123.

In an embodiment, the fixed part 210 may be fixed to the hinge housing 119 through a second holder 118 disposed in the hinge housing 119. For example, the second holder 118 may include a recess 1181 in which a protruding portion 219 of the fixed part 210 is received. The protruding portion 219 of the fixed part 210 may protrude in the −Z-axis direction.

In an embodiment, the fixed part 210 may include first rails 211-1 and second rails 211-2 formed on opposite sides of each of the first rails 211-1. First support portions 232-1 of the moving parts 230 may make contact with the first rails 211-1, and second support portions 232-2 of the moving parts 230 may make contact with the second rails 211-2. For example, the first rails 211-1 may further protrude toward the moving parts 230 beyond the second rails 211-2. For example, the first rails 211-1 may further protrude in the +Z-axis direction beyond the second rails 211-2. Referring to FIG. 4, at least parts of the first rails 211-1 may be received in spaces between the second support portions 232-2 of the moving parts 230.

In an embodiment, the support portions 232 of the moving parts 230 may make contact with the rails 211 of the fixed part 210. Each of the support portions 232 may include the first support portion 232-1 making contact with the first rail 211-1 and the second support portions 232-2 making contact with the second rails 211-2. At least part of the first support portion 232-1 may make contact with the first rail 211-1. At least parts of the second support portions 232-2 may make contact with the second rails 211-2. The first support portion 232-1 may have a concave shape, compared to the second support portions 232-2.

In an embodiment, a first support portion 232-1 may extend from the cover portion 231 in the −Z-axis direction. Unlike a second support portion 232-2, the first support portion 232-1 may be formed of two portions. For example, first support portions 232-1 may be formed on opposite sides of the second support portion 232-2 in the direction of the folding axis F. The second support portion 232-2 may be formed between the first support portions 232-1. A second rail 211-2 of the fixed part 210 may be received between the first support portions 232-1. As described above, a protruding portion (e.g., the first rail 211-1) of the rail 211 may be received in a depression (e.g., the first support portion 232-1) of the moving part 230, and thus the moving part 230 may be prevented from being separated from the fixed part 210.

Figure 5A:
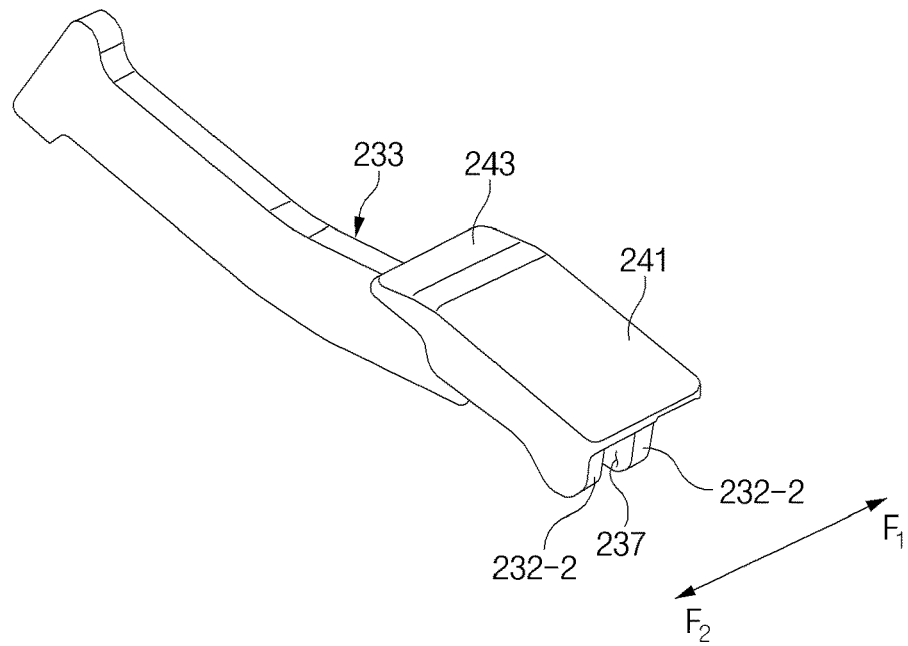
FIGS. 5A and 5B are views illustrating a moving part of the protective structure of the electronic device according to an embodiment.
Figure 5B:
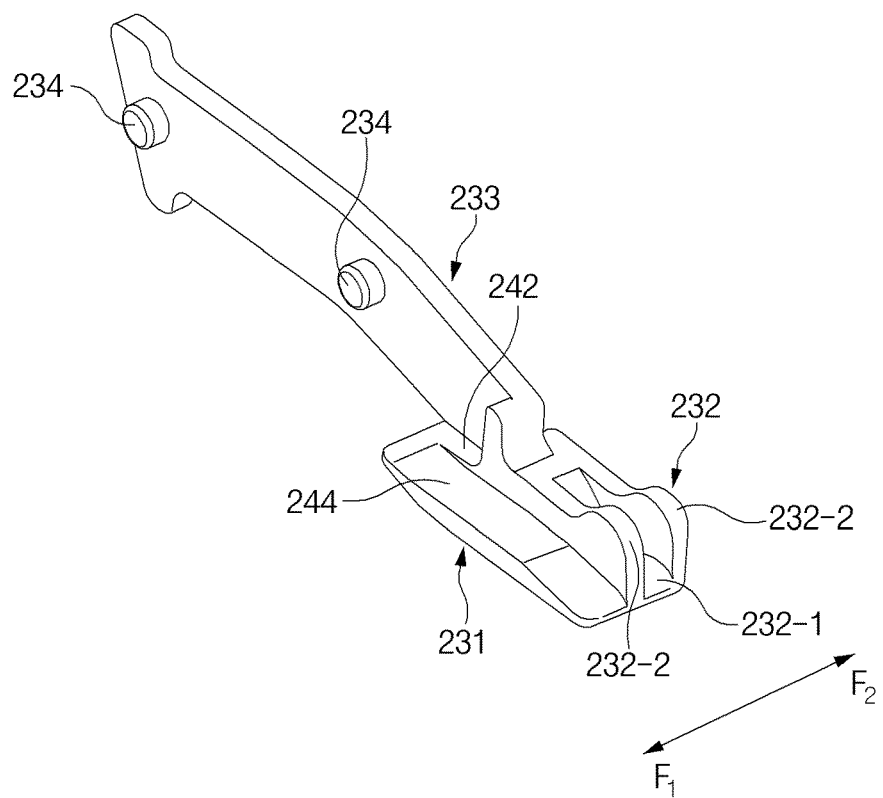

FIGS. 5A and 5B are views illustrating the moving part of the protective structure of the electronic device according to an embodiment.

Referring to FIGS. 5A and 5B, the moving part 230 may include the cover portion 231, the support portion 232, and the connecting portion 233.

In an embodiment, the cover portion 231 may include a first surface 241 and a second surface 242 that faces away from the first surface 241 and on which the support portion 232 is formed.

In an embodiment, in a flat state of the electronic device, the first surface 241 may be disposed on a surface of a flexible display (e.g., the flexible display 120 of FIG. 2A) and may form the front surface of the electronic device 100 (e.g., FIG. 2A). Referring to FIG. 5A, the first surface 241 may include an inclined area 243 that is inclined toward the connecting portion 233. The inclined area 243 may be formed to be inclined toward the connecting portion 233 so as to be received in a space (e.g., the first receiving space 117a of FIG. 2B) between a decorative member (e.g., the first decorative member 113 of FIG. 2B) and the flexible display 120 in a folded state of the electronic device.

In an embodiment, the second surface 242 may be formed to face part (e.g., the folding area 123 of FIG. 4) of the surface of the flexible display (e.g., the flexible display 120 of FIG. 4). In some embodiments, the second surface 242 may face a protective member (e.g., the protective member 290 of FIG. 4). The support portion 232 of the moving part 230 may extend on the second surface 242. In an embodiment, the second surface 242 may additionally include an extension area 244. For example, the extension area 244 may include an area further extending in a first folding axis direction F1 from the area where the second support portions 232-2 are formed. The extension area 244 may extend to cover an edge (e.g., the third edge P3 or the fourth edge P4 of FIG. 2A) of a folding area (e.g., the folding area 123 of FIG. 4) of the flexible display (e.g., the flexible display 120 of FIG. 4).

In an embodiment, the support portion 232 may extend from the second surface 242 of the cover portion 231 in a substantially vertical direction. For example, the support portion 232 may protrude from the second surface 242 of the cover portion 231 toward a fixed part (e.g., the fixed part 210 of FIG. 4). In an embodiment, the support portion 232 may include the first support portion 232-1 and the second support portions 232-2. In various embodiments, two or more second support portions 232-2 may be formed.

Referring to FIG. 5B, the first support portion 232-1 may be formed between the second support portions 232-2. In an embodiment, the second support portions 232-2 may be formed to face each other. The first support portion 232-1 may be formed in a space 237 between the second support portions 232-2. For example, the second support portions 232-2 may further protrude beyond the first support portion 232-1. In an embodiment, the first support portion 232-1 may make contact with a first rail (e.g., the first rail 211-1 of FIG. 4) of the fixed part (e.g., the fixed part 210 of FIG. 4), and the second support portions 232-2 may make contact with second rails (e.g., the second rails 211-2 of FIG. 4) of the fixed part (e.g., the fixed part 210 of FIG. 4).

In an embodiment, the connecting portion 233 may extend from the cover portion 231 in a direction perpendicular to folding axis directions F1 and F2. For example, the connecting portion 233 may extend from the second surface 242 of the cover portion 231. The connecting portion 233 may include the guide protrusions 234 protruding in the first folding axis direction F1. In various embodiments, the guide protrusions 234 may protrude in the first folding axis direction F1 and/or the second folding axis direction F2.

Figure 6A:
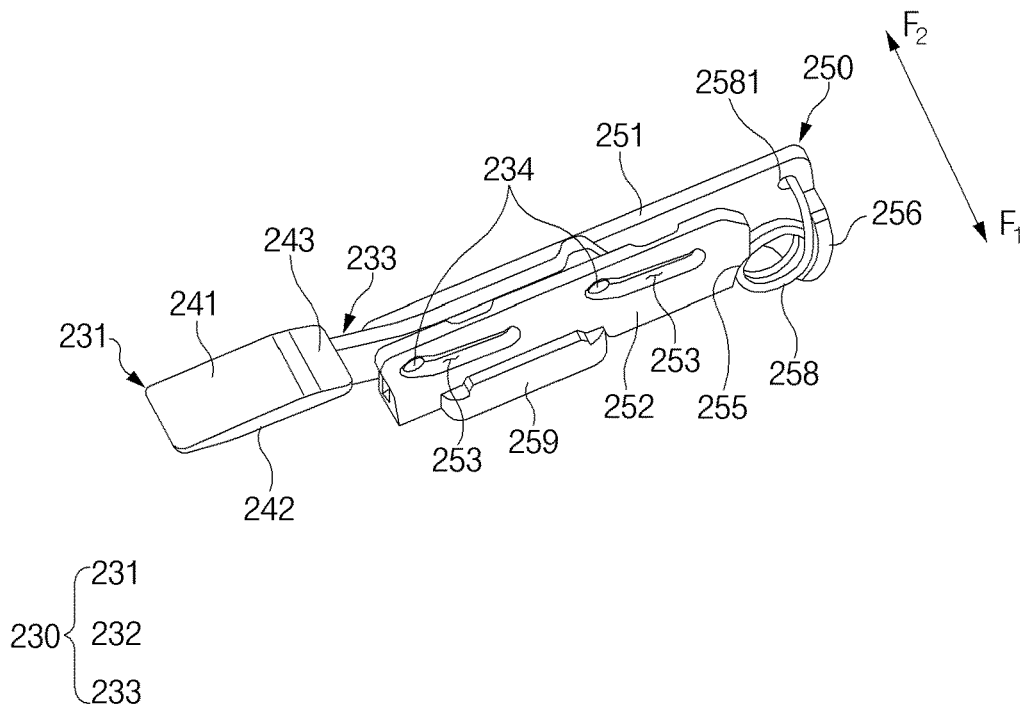
FIGS. 6A, 6B, and 6C are views illustrating coupling of the moving part and a guide part of the protective structure of the electronic device according to an embodiment.
Figure 6B:
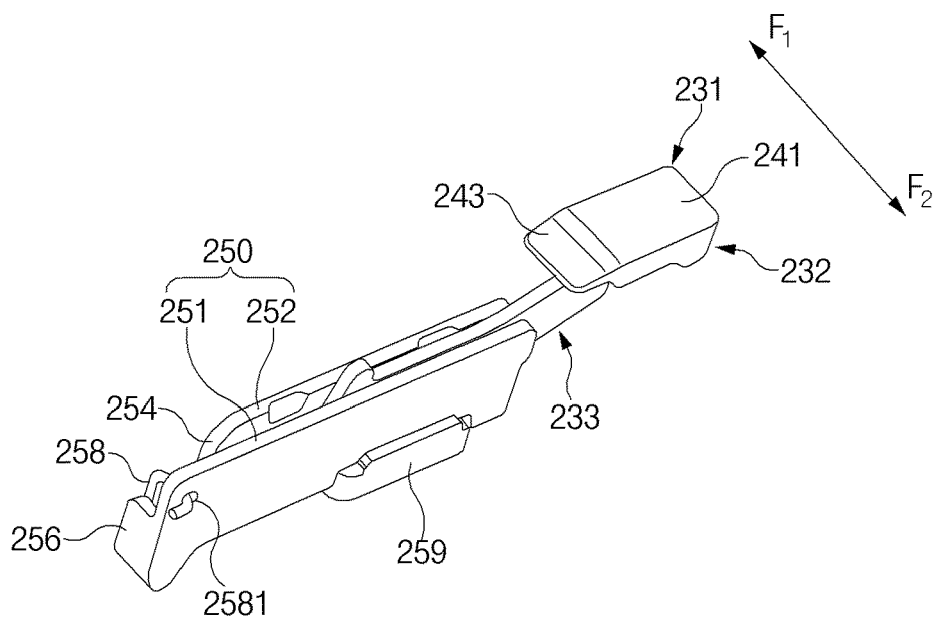
Figure 6C:
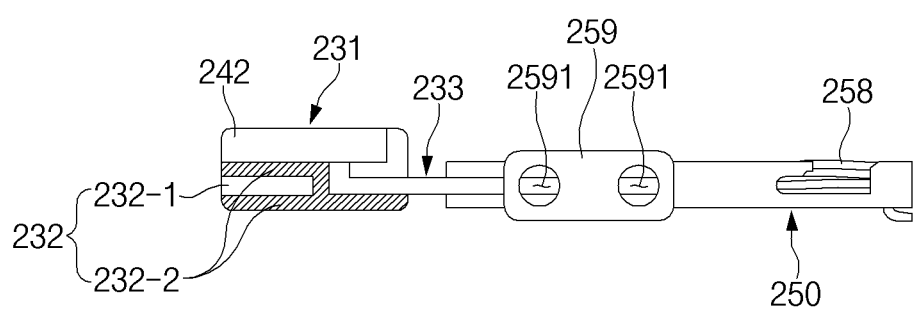

FIGS. 6A, 6B, and 6C are views illustrating coupling of the moving part and the guide part of the protective structure of the electronic device according to an embodiment.

Referring to FIGS. 6A, 6B, and 6C, the guide part 250 may include the first portion 251, the second portion 252 facing the first portion 251, and the elastic member 258. At least part of the connecting portion 233 may be disposed between the first portion 251 and the second portion 252. Referring to FIGS. 6A, 6B, and 6C, the second portion 252 may have the guide grooves 253 formed therein in which the guide protrusions 234 are received. However, the guide grooves 253 are not necessarily limited to being formed in the second portion 252. For example, the guide grooves 253 may be formed in the first portion 251, or may be formed in the first portion 251 and the second portion 252. The guide protrusions 234 may protrude in the first folding axis direction F1 and/or the second folding axis direction F2 to correspond to the positions of the guide grooves 253.

In an embodiment, the guide part 250 may include the first holder 259. The first holder 259 may fix the guide part 250 to the housing (e.g., the first housing 111 and the second housing 112 of FIGS. 3B and 3C) of the electronic device 100. The first holder 259 may be formed to surround at least part of the first portion 251 and at least part of the second portion 252. The first holder 259 may have one or more fastening holes 2591 formed in a rear surface thereof and may be coupled to the housing through the fastening holes 2591. For example, protruding bosses formed on the housing may be inserted into the fastening holes 2591 such that the guide part 250 is fixed to the housing (e.g., the first housing 111 and the second housing 112 of FIGS. 3B and 3C).

In an embodiment, the elastic member 258 may apply an elastic force to the moving part 230. For example, the elastic member 258 may be compressed or stretched depending on a movement of the moving part 230.

In an embodiment, the elastic member 258 may be disposed between a sidewall 256 formed on the first portion 251 and an end surface 255 of the second portion 252. Referring to FIGS. 6A and 6B, the sidewall 256 may extend from the first portion 251 in the folding axis directions F1 and F2. The sidewall 256 may be formed such that at least part thereof faces the end surface 255 of the second portion 252.

In the illustrated embodiment, the guide part 250 may have a through-hole 2581 through which at least part of the elastic member 258 passes. For example, the through-hole 2581 may be formed in the first portion 251. For example, one end portion of the elastic member 258 may be connected to the connecting portion 233 of the moving part 230, and an opposite end portion of the elastic member 258 may be inserted into the through-hole 2581.

As described above, the position of the elastic member 258 may be fixed by the structure (e.g., the through-hole 2581, the sidewall 256, and the end surface 255) of the guide part 250. Accordingly, the moving part 230 may move relative to the elastic member 258 and the guide part 250, and the elastic member 258 may be compressed or stretched in the state of being fixed to the guide part 250. In addition to the above-described structure, the guide part 250 may include various structures for fixing the elastic member 258.

Figure 7A:
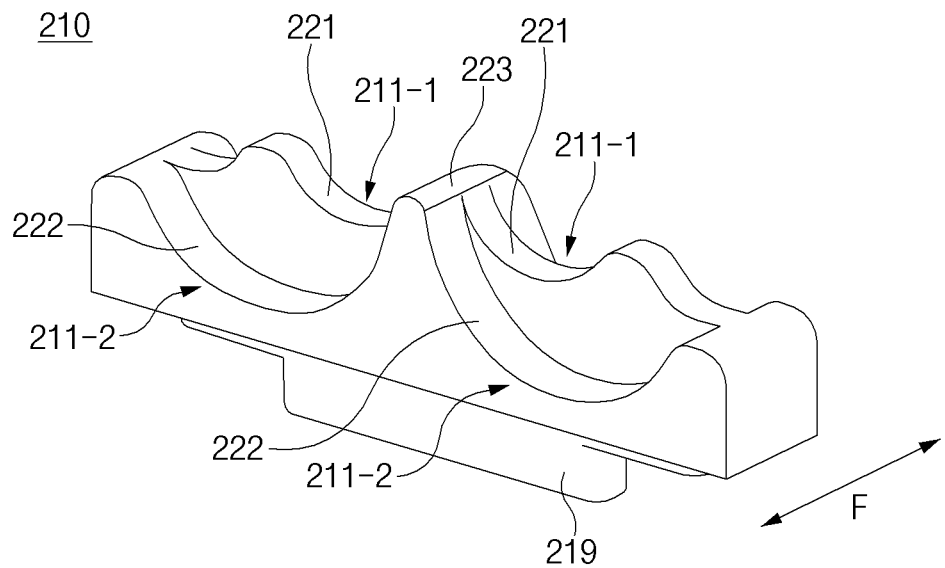
FIGS. 7A, 7B, and 7C are views illustrating a fixed part of the protective structure of the electronic device according to an embodiment.
Figure 7B:
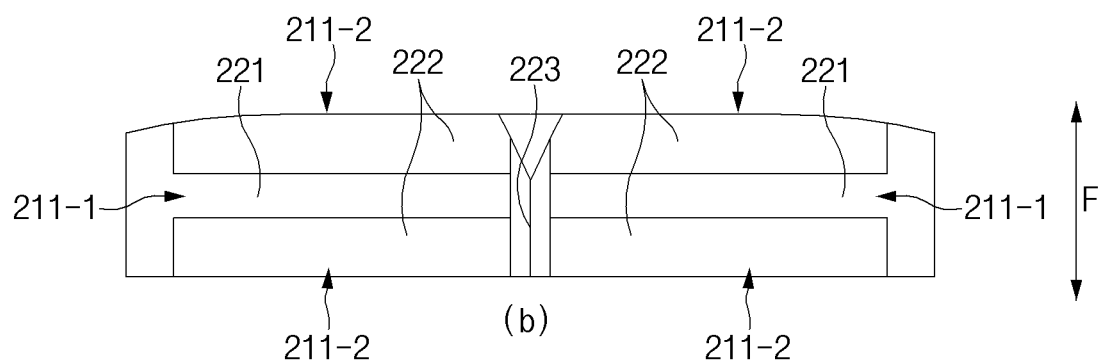
Figure 7C:
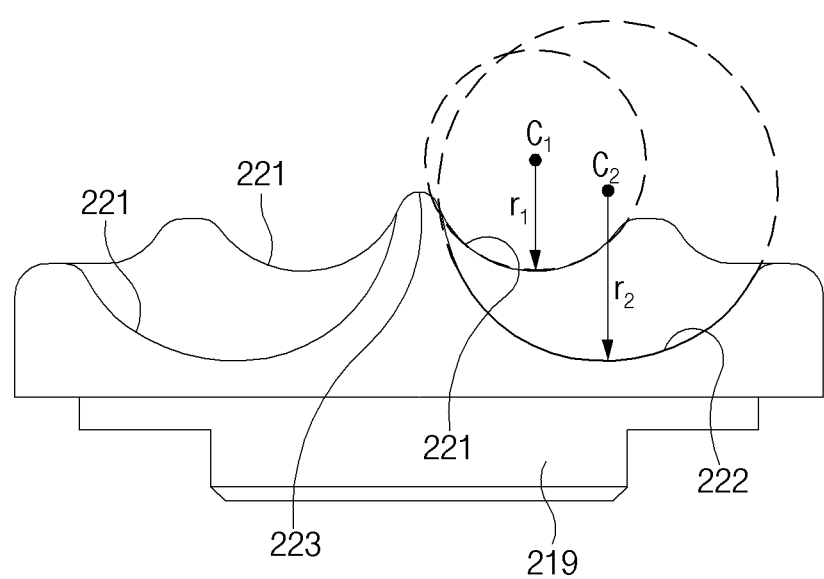

FIGS. 7A, 7B, and 7C are views illustrating the fixed part of the protective structure of the electronic device according to an embodiment.

In an embodiment, the fixed part 210 may include the first rails 211-1, the second rails 211-2, and the protruding portion 219 inserted into a second holder (e.g., the second holder 118 of FIG. 4) of a hinge housing (e.g., the hinge housing 119 of FIG. 4). In an embodiment, the first rails 211-1 may include first arc surfaces 221. For example, the first arc surfaces 221 may have a first radius of curvature r1.

Central axes C1 of the first arc surfaces 221 may be parallel to the folding axis F. In an embodiment, the first rails 211-1 may be formed to make contact with at least parts of the first support portions 232-1. In an embodiment, the first rails 211-1 may be formed between the second rails 211-2.

In an embodiment, the second rails 211-2 may include second arc surfaces 222. For example, the second arc surfaces 222 may have a second radius of curvature r2. Central axes C2 of the second arc surfaces 222 may be parallel to the folding axis F. In an embodiment, the second rails 211-2 may be formed to make contact with at least parts of the second support portions 232-2. In an embodiment, the second rails 211-2 may be formed on the opposite sides of the first rails 211-1 in the direction of the folding axis F.

In various embodiments, the central axes C1 and C2 may be parallel to the folding axis F.

In an embodiment, the fixed part 210 may include a central protruding portion 223. A first moving part (e.g., the first moving part 230a of FIG. 2B) may be coupled to one side of the fixed part 210 with respect to the central protruding portion 223, and a second moving part (e.g., the second moving part 230b of FIG. 2B) may be coupled to an opposite side of the fixed part 210. In various embodiments, the central protruding portion 223 may be formed in a position aligned with a folding axis (e.g., the folding axis F of FIG. 2A) when a flexible display (e.g., the flexible display 120 of FIG. 2A) of the electronic device 100 is viewed from the front.

In various embodiments, the fixed part 210 may be formed such that the first arc surfaces 221 of the first rails 211-1 have a smaller radius of curvature than the second arc surfaces 222 of the second rails 211-2. For example, the first radius of curvature r1 of the first arc surfaces 221 may range from 0.7 to 0.9. For example, the second radius of curvature r2 of the second arc surfaces 222 may range from 1.1 to 1.3.

Figure 8:
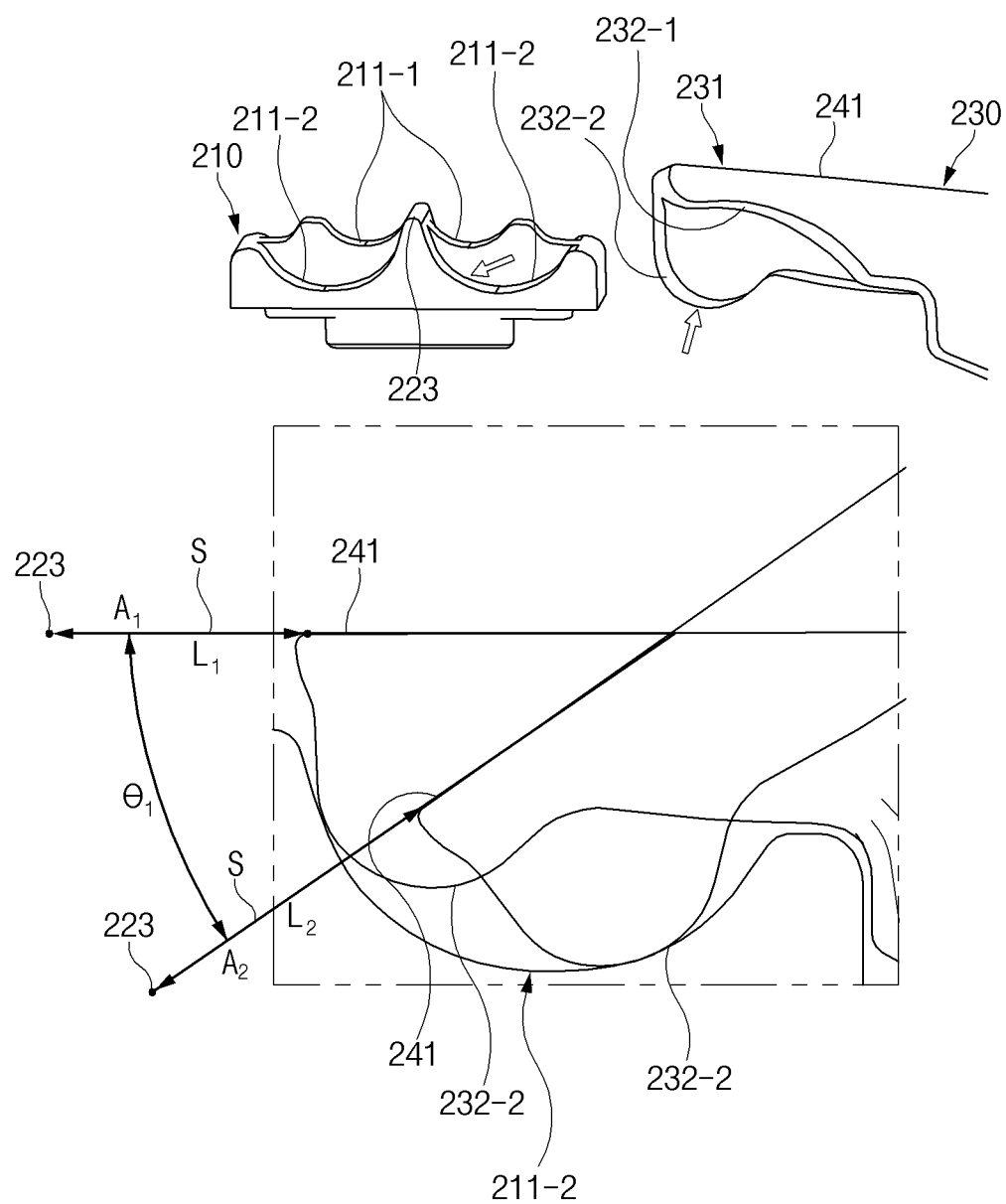
FIG. 8 is a view illustrating coupling and operation of the moving part and the fixed part of the protective structure of the electronic device according to an embodiment.
Figure 9:
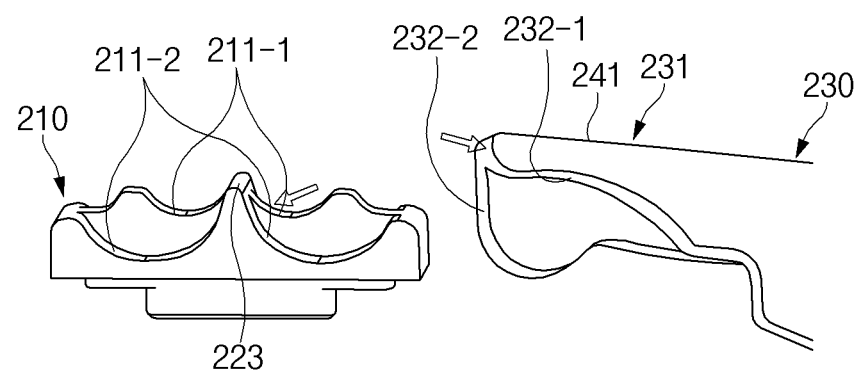
FIG. 9 is a view illustrating coupling and operation of the moving part and the fixed part of the protective structure of the electronic device according to an embodiment.
Figure 9:
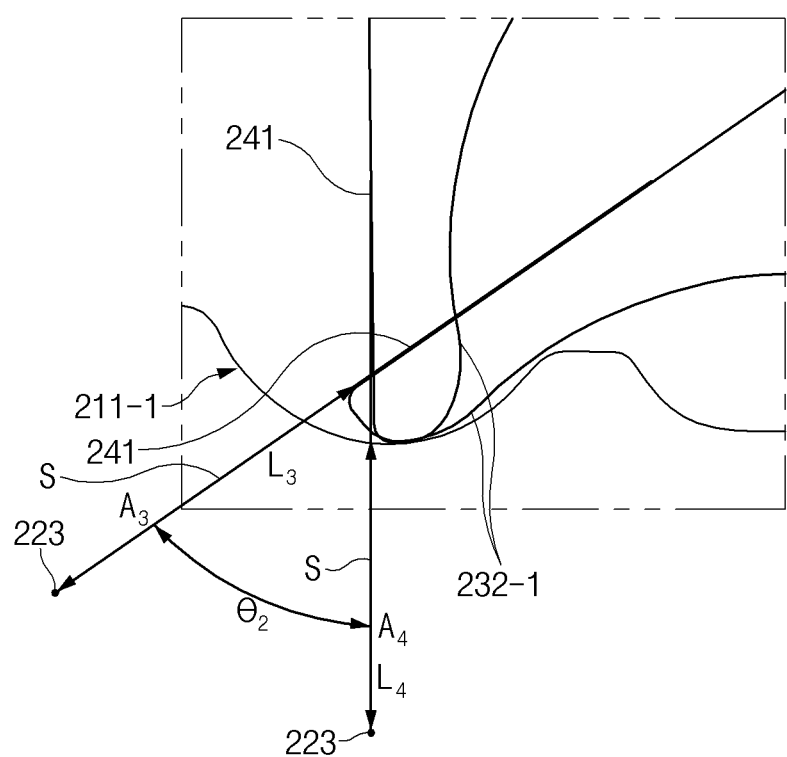

FIG. 8 is a view illustrating coupling and operation of the moving part and the fixed part of the protective structure of the electronic device according to an embodiment. FIG. 9 is a view illustrating coupling and operation of the moving part and the fixed part of the protective structure of the electronic device according to an embodiment.

In an embodiment, the moving part 230 may be disposed such that at least part of the moving part 230 makes contact with the first rail 211-1 of the fixed part 210 and at least part of the moving part 230 makes contact with the second rail 211-2 of the fixed part 210. For example, the first support portion 232-1 may make contact with the first rail 211-1, and the second support portion 232-2 may make contact with the second rail 211-2.

In an embodiment, the moving part 230 may move relative to the fixed part 210. For example, the moving part 230 may rotate and linearly move while maintaining the contact with the fixed part 210.

In an embodiment, the rotation of the moving part 230 may include rotation of the moving part 230 about the central axis (e.g., the central axes C1 and C2 of FIG. 7C) of the arc surface of the rail 211.

In an embodiment, the linear movement of the moving part 230 may include a movement of the moving part 230 in a direction away from the central protruding portion 223 or in a direction toward the central protruding portion 223.

In an embodiment, the rotation and the linear movement of the moving part 230 may be simultaneously performed.

In an embodiment, in the rotation of the moving part 230, the rotation angle may be defined as the rotation angle of an extension surface S extending from the first surface 241 of the cover portion 231.

In an embodiment, the moving part 230 may perform a first operation (e.g., FIG. 8) that includes first rotation and a first linear movement and a second operation (e.g., FIG. 9) that includes second rotation and a second linear movement.

Referring to FIG. 8, the first operation of the moving part 230 may be performed by a movement of the second support portion 232-2 along a surface of the second rail 211-2 (e.g., the second arc surface 222 of FIGS. 7A, 7B, and 7C). The first operation may include the first rotation of the moving part 230 by a first angle θ1 and the first linear movement of the moving part 230 by a first displacement L2−L1.

Referring to FIG. 8, through the first operation, the moving part 230 may move from a first state A1 to a second state A2. The moving part 230 may rotate by the first angle θ1 from the first state A1 and may linearly move by the first displacement L2−L1 in the direction away from the central protruding portion 223. The rotation and the linear movement of the moving part 230 may be simultaneously performed. In various embodiments, the first state A1 of the moving part 230 may include a case where the electronic device 100 is in a flat state (e.g., FIG. 10A).

Referring to FIG. 9, the second operation of the moving part 230 may be performed by a movement of the first support portion 232-1 along a surface of the first rail 211-1 (e.g., the first arc surface 221 of FIGS. 7A, 7B, and 7C). The second operation may include the second rotation of the moving part 230 by a second angle θ2 and the second linear movement of the moving part 230 by a second displacement L4−L3.

Referring to FIG. 9, through the second operation, the moving part 230 may move from a third state A3 to a fourth state A4. The moving part 230 may rotate by the second angle θ2 from the third state A3 and may linearly move by the second displacement L4−L3 in the direction away from the central protruding portion 223. The rotation and the linear movement of the moving part 230 may be simultaneously performed. In various embodiments, the fourth state A4 of the moving part 230 may be the state of the moving part 230 when the electronic device is in a fully-folded state (e.g., FIG. 10C).

In various embodiments, the second state A2 may be substantially the same as the third state A3. In various embodiments, in the second state A2, the third state A3, or any state between the second state A2 and the third state A3, the first support portion 232-1 of the moving part 230 may make contact with the first rail 211-1, and the second support portion 232-2 of the moving part 230 may make contact with the second rail 211-2. In other words, the sum of the first angle θ1 and the second angle θ2 may equal to 90 degrees or more. To continuously perform the first operation (e.g., FIG. 8) and the second operation (e.g., FIG. 9), the moving part 230 may be formed to include a state of simultaneously making contact with the first rail 211-1 and the second rail 211-2.

Referring to FIGS. 8 and 9, in the first operation, the moving part 230 may have a greater linear displacement than in the second operation.

For example, referring to FIG. 8, the moving part 230 may be spaced apart from the central protruding portion 223 by the first length L1 in the first state A1 and may be spaced apart from the central protruding portion 223 by the second length L2 in the second state A2. The difference between the first length L1 and the second length L2 may refer to the first linear displacement L2−L1 of the moving part 230 in the first operation.

For example, referring to FIG. 9, the moving part 230 may be spaced apart from the central protruding portion 223 by the third length L3 in the third state A3 and may be spaced apart from the central protruding portion 223 by the fourth length L4 in the fourth state A4. The difference between the third length L3 and the fourth length L4 may refer to the second linear displacement L4−L3 of the moving part 230 in the second operation. The first linear displacement L2−L1 may be greater than the second linear displacement L4−L3.

Referring to FIGS. 8 and 9, in the first operation, the moving part 230 may have a smaller rotation angle than in the second operation. For example, the first rotation angle θ1 in the first rotation may range from 0 degrees to 37 degrees, and the second rotation angle θ2 in the second rotation may range from 33 degrees to 90 degrees.

Figure 10A:
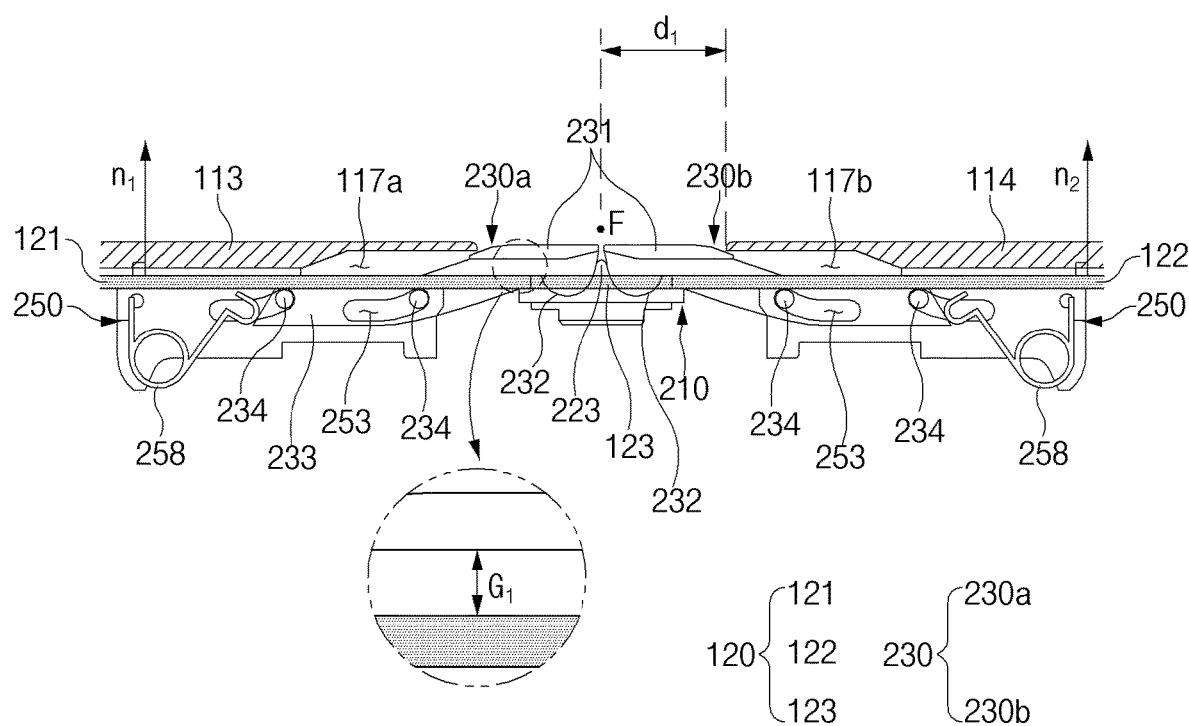
FIG. 10A is a view illustrating the protective structure in a flat state of the electronic device according to an embodiment.
Figure 10B:
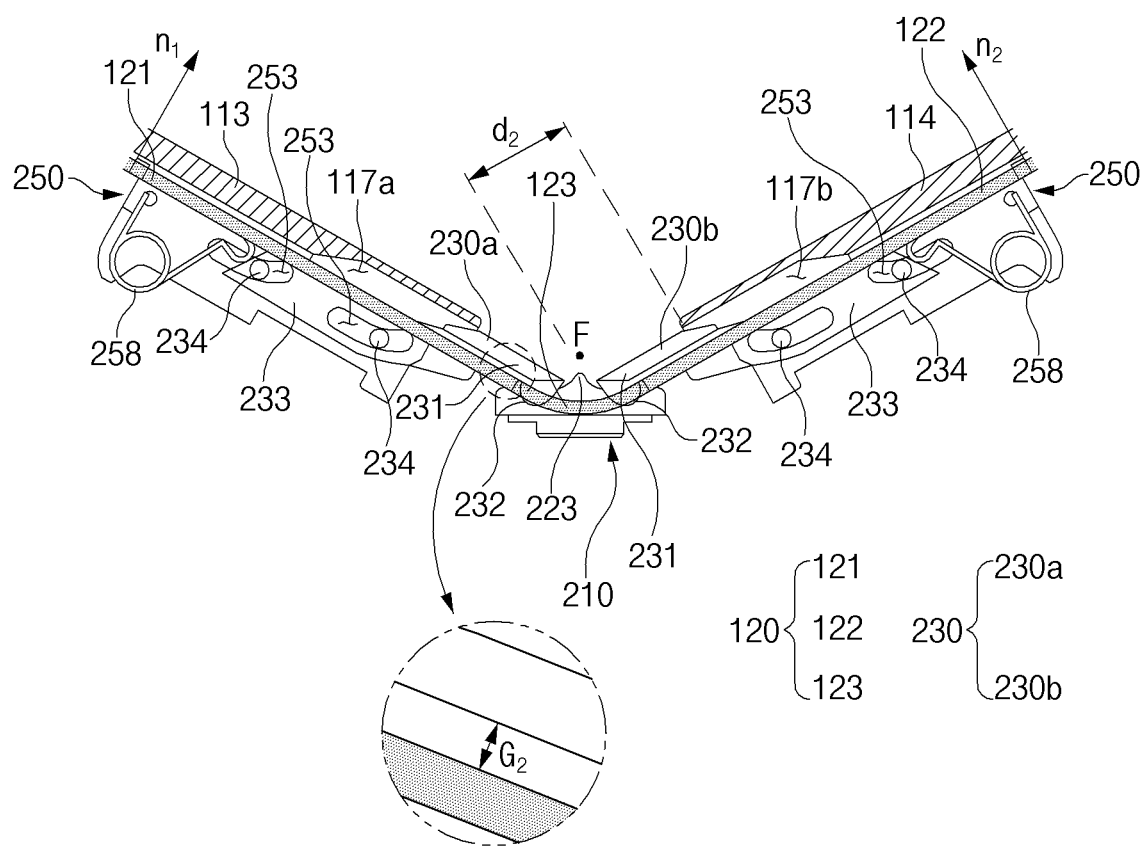
FIG. 10B is a view illustrating the protective structure in a folded state of the electronic device according to an embodiment.
Figure 10C:
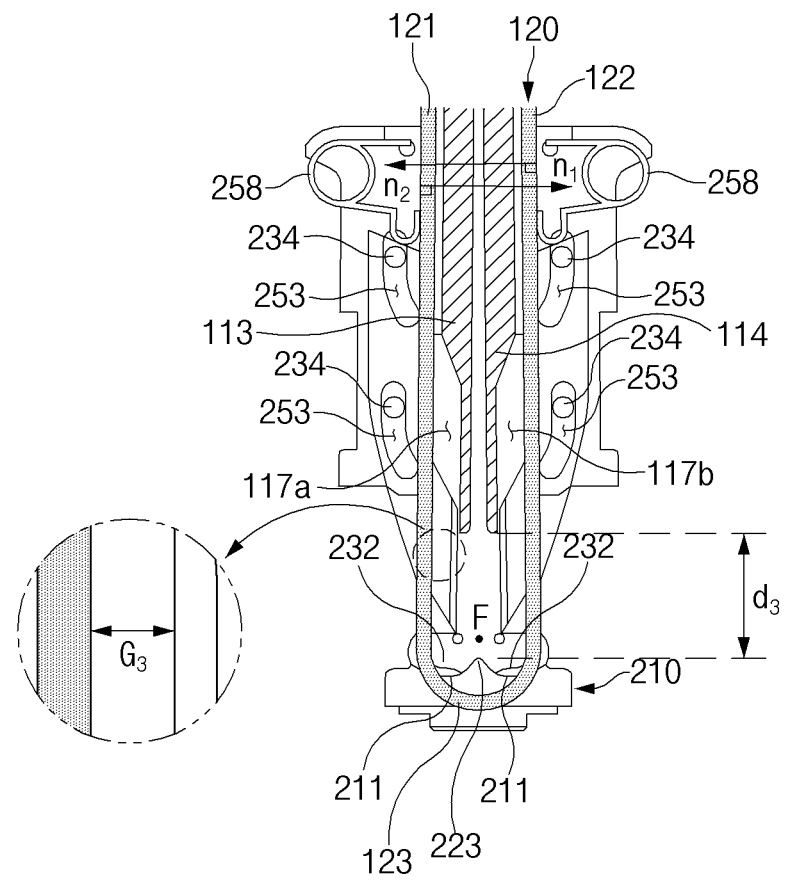
FIG. 10C is a view illustrating the protective structure in a fully-folded state of the electronic device according to an embodiment.

FIGS. 10A, 10B, and 10C are views illustrating operations of the protective structure of the electronic device according to an embodiment. FIG. 10A is a view illustrating the protective structure in a flat state of the electronic device. FIG. 10B is a view illustrating the protective structure in a folded state of the electronic device. FIG. 10C is a view illustrating the protective structure in a fully-folded state of the electronic device.

In an embodiment, the flat state may include a state in which the first area 121 and the second area 122 of the flexible display 120 form substantially the same plane. For example, the flat state may include a state in which the folding area 123 is flat. For example, the flat state may include a state in which the normal vector n1 of the first area 121 and the normal vector n2 of the second area 122 are substantially parallel to each other.

In an embodiment, the folded state may include a state in which the folding area 123 of the flexible display 120 is formed to be a first curved surface. The normal vector n1 of the first area 121 may form a first angle θ1 with the normal vector n2 of the second area 122.

In an embodiment, the fully-folded state may include a state in which the folding area 123 of the flexible display 120 is formed to be a second curved surface. The second curved surface may have a greater curvature than the first curved surface. For example, the normal vector n1 of the first area 121 may form a second angle θ2 greater than first angle θ1 with the normal vector n2 of the second area 122. For example, the second angle θ2 may be substantially 180 degrees, or may be 180 degrees or more.

In an embodiment, at least part of the cover portion 231 of the first moving part 230a may be received in the first receiving space 117a. At least part of the cover portion 231 of the second moving part 230b may be received in the second receiving space 117b. For example, in the flat state, at least parts of the cover portions 231 may overlap the first decorative member 113 and the second decorative member 114 when the flexible display 120 is viewed from above.

In an embodiment, the moving parts 230 may be configured such that the cover portions 231 are further received in the receiving spaces 117a and 117b when the electronic device 100 moves from the flat state to the folded state. Through the movements of the cover portions 231, collision of the folding area 123 and the cover portions 231 may be prevented when the electronic device 100 is unfolded or folded.

Referring to FIG. 10A, in the flat state, the cover portions 231 may form substantially the same plane together with the first decorative member 113 and the second decorative member 114. The cover portions 231 may form a first gap G1 with the surface of the folding area 123.

Referring to FIG. 10B, in the folded state, the cover portions 231 may form a second gap G2 with the surface of the folding area 123. The second gap G2 may be smaller than the first gap G1.

Referring to FIG. 10C, in the fully-folded state, the cover portions 231 may form a third gap G3 with the surface of the folding area 123. The third gap G3 may be smaller than the first gap G1.

In an embodiment, the moving parts 230 may move such that the gap that the cover portions 231 form with the folding area 123 varies depending on a state of the electronic device 100. Furthermore, as the electronic device 100 is folded to a greater degree, the moving parts 230 may be further received in the receiving spaces 117a and 117b. As described above, when the electronic device 100 is unfolded or folded, the moving parts 230 may move along predetermined paths such that the folding area 123 and the moving parts 230 do not collide with each other.

In an embodiment, the predetermined paths along which the moving parts 230 move may vary depending on the shape of the guide grooves 253 formed in the guide parts 250.

Referring to FIGS. 10A, 10B, and 10C, the elastic members 258 may be compressed as the electronic device 100 moves from the flat state toward the fully-folded state. For example, the elastic members 258 may be in equilibrium when the electronic device 100 is in the flat state. In various embodiments, the elastic members 258 may include torsion springs.

In an embodiment, when the electronic device 100 moves from the flat state to the fully-folded state, the distances from the central protruding portion 223 to the first housing 111 and the second housing 112 may be changed. For example, referring to FIGS. 10A, 10B, and 10C, the distances from the central protruding portion 223 of the fixed part 210 to the decorative members 113 and 114 may be decreased as the electronic device 100 moves from the flat state to the folded state. For example, in the flat state of FIG. 10A, the decorative members 113 and 114 may be spaced apart from the central protruding portion 223 by a first distance d1. For example, in the folded state of FIG. 10B, the decorative members 113 and 114 may be spaced apart from the central protruding portion 223 by a second distance d2. For example, in the fully-folded state of FIG. 10C, the decorative members 113 and 114 may be spaced apart from the central protruding portion 223 by a third distance d3.

In an embodiment, the first distance d1 may be greater than the second distance d2 and the third distance d3. The second distance d2 may be greater than the third distance d3. In various embodiments, when the electronic device 100 is folded, the first housing 111 (e.g., the first decorative member 113) and the second housing 112 (e.g., the second decorative member 114) may move toward the central protruding portion 223 (or, the folding axis F).

In the folding operation, the support portions 232 of the moving parts 230 may press the fixed part 210 by the behaviors of the housing 111 and 112 (e.g., the first decorative member 113 and the second decorative member 114). At this time, reaction forces by the fixed part 210 fixed to the hinge housing 119 may be applied to the moving parts 230. The reaction forces may move the moving parts 230 in directions away from the central protruding portion 223. For example, the support portions 232 of the moving parts 230 may press the rails 211 of the fixed part 210, and the support portions 232 of the moving parts 230 may be pressed in the directions away from the central protruding portion 223 by reactions against the pressing.

In an embodiment, when the electronic device 100 moves from the fully-folded state to the flat state, the distances between the central protruding portion 223 and the housings 111 and 112 (e.g., the first decorative member 113 and the second decorative member 114) may be increased (d3→d2→d1), and the pressures applied from the fixed part 210 to the moving parts 230 may be released. At this time, the elastic members 258 may apply elastic forces to the moving parts 230 to move the moving parts 230 in directions toward the central protruding portion 223 (or, the folding axis F).

The protective structure 200 disclosed in the disclosure may include the moving parts 230 that move using mechanical movements occurring in the folding operation and the unfolding operation of the foldable electronic device 100. Accordingly, the protective structure 200 may protect the folding area 123 by covering the edges of the folding area 123 in the flat state and may not collide with the folding area 123 in the folding operation.

Figure 11A:
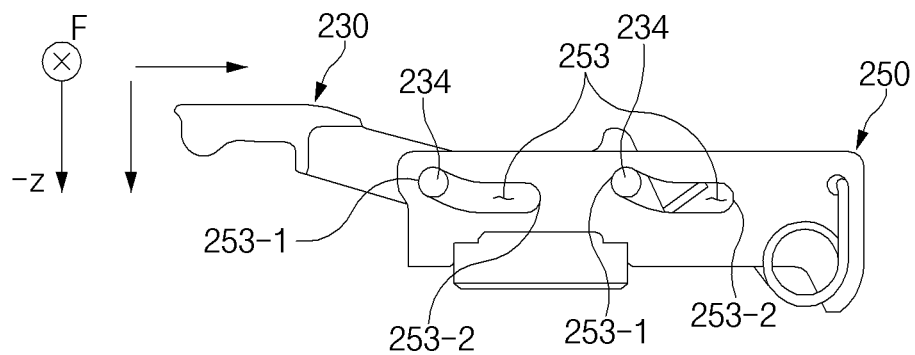
FIGS. 11A, 11B, and 11C are views illustrating guide protrusions and guide grooves of the protective structure of the electronic device according to an embodiment.
Figure 11B:
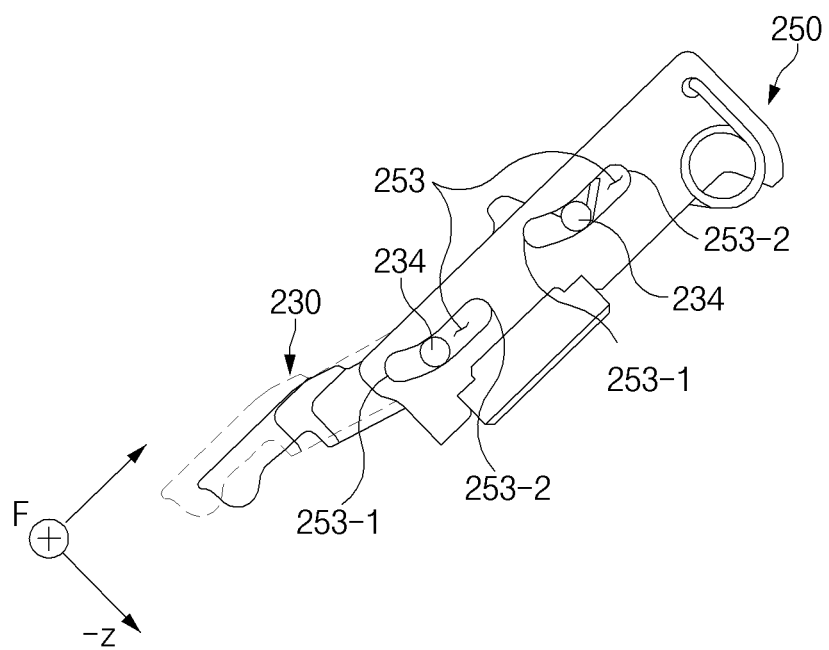
Figure 11C:
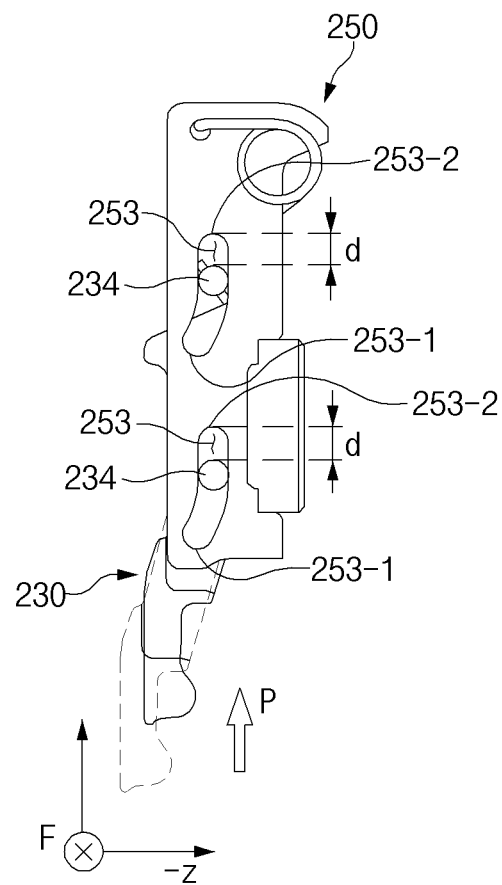

FIGS. 11A, 11B, and 11C are views illustrating the guide grooves of the protective structure of the electronic device according to an embodiment.

In an embodiment, each of the guide grooves 253 of the guide parts 250 may include a first end portion 253-1 relatively close to the folding axis F and a second end portion 253-2 relatively far away from the folding axis F. In an embodiment, the guide protrusions 234 may move between the first end portions 253-1 and the second end portions 253-2.

For example, when the electronic device 100 moves from a flat state to a folded state, the guide protrusions 234 of the moving parts 230 may move from the first end portions 253-1 toward the second end portions 253-2. When the electronic device 100 moves from the folded state to the flat state, the guide protrusions 234 may move from the second end portions 253-2 toward the first end portions 253-1.

In the illustrated embodiment, in the flat state, the guide protrusions 234 may be located in the first end portions 253-1. In the folded state, the guide protrusions 234 may be located in positions spaced apart from the first end portions 253-1, as compared with when the electronic device 100 is in the flat state. In a fully-folded state, the guide protrusions 234 may be located closer to the second end portions 253-2 than in the folded state and the flat state.

In an embodiment, in the fully-folded state, the guide protrusions 234 may be located in positions spaced apart from the second end portions 253-2 at predetermined intervals d.

For example, when the electronic device 100 falls in the fully-folded state, main impact P may be applied to the fixed part 210. The moving parts 230 not fixed may be moved in the impact direction (e.g., in the upper direction with respect to FIG. 11C) by the impact P, and therefore the guide protrusions 234 may collide with the second end portions 253-2 of the guide grooves 253. The collision may cause damage to the guide grooves 253 and the guide protrusions 234. Accordingly, the protective structure 200 according to the embodiments disclosed in the disclosure may be formed such that in the fully-folded state, the guide protrusions 234 of the moving parts 230 are spaced apart from end portions (e.g., the second end portions 253-2) of the guide grooves 253 of the guide parts 250 at predetermined intervals. Thus, collision of the guide protrusions 234 with the guide parts 250 may be prevented.

According to embodiments of the disclosure, an electronic device may include a housing structure including a first housing 111, a second housing 112, and a hinge housing 119, a hinge structure 150 that is at least partially disposed in the hinge housing 119 and that connects the first housing 111 and the second housing 112 to allow the first housing 111 and the second housing 112 to be folded or unfolded, with a folding axis F therebetween, a display 120 extending from the first housing 111 to the second housing 112 across the hinge structure 150, and a protective structure 200 disposed at an edge of the hinge housing 119 that faces a direction of the folding axis F. The protective structure 200 may include a fixed part 210 disposed in the hinge housing 119, guide parts 250 disposed in the first housing 111 and the second housing 112, respectively, and moving parts 230 including cover portions 231 that cover at least parts of a periphery of the display 120. The moving parts 230 may be configured to be movable relative to the guide parts 250 and the fixed part 210 such that a gap G1, G2, or G3 between a surface of the display 120 and the cover portions 231 is changed.

In various embodiments, the display 120 may include a first area 121 and a second area 122 formed to be flat and a folding area 123 formed between the first area 121 and the second area 122 and formed to be flat or curved. The electronic device 100 may include a flat state in which the folding area 123 is substantially flat and a folded state in which the folding area 123 is substantially curved. The cover portions 231 of the moving parts 230 may be spaced apart from the surface of the display 120 with a first gap G1 therebetween in the flat state and may be spaced apart from the surface of the display 120 with a second gap G2 therebetween in the folded state, the second gap G2 being smaller than the first gap G1.

In various embodiments, the moving parts 230 may be configured to be movable so as to be spaced apart from the folding axis F by a first distance L1 in the flat state and by a second distance L4 longer than the first distance L1 in the folded state.

In various embodiments, the electronic device may further include decorative members 113 and 114 formed to cover at least parts of the periphery of the display 120, and the moving parts 230 may be configured to be movable such that the cover portions 231 are located to form a substantially continuous plane with the decorative members 113 and 114, or the cover portions 231 are located closer to the surface of the display 120 than the decorative members 113 and 114.

In various embodiments, receiving spaces 117 may be defined between the decorative members 113 and 114 and the surface of the display 120, and the cover portions 231 may be configured to be movable such that at least parts thereof are received in the receiving spaces 117.

In various embodiments, the moving parts 230 may be configured such that the cover portions 231 move toward the surface of the display 120 and move away from the folding axis F when the electronic device 100 moves from the flat state to the folded state, and the moving parts 230 may be configured such that the cover portions 231 move away from the surface of the display 120 and move toward the folding axis F when the electronic device 100 moves from the folded state to the flat state.

In various embodiments, the fixed part 210 may include rails 211. The moving parts 230 may include support portions 232 protruding from the cover portions 231 toward the fixed part 210, and at least parts of the support portions 232 may make contact with surfaces of the rails 211. The moving parts 230 may be configured to rotate relative to the fixed part 210 by predetermined angles θ1 and θ2 and linearly move such that distances from the folding axis F are changed, when the first housing 111 and the second housing 112 are folded or unfolded.

In various embodiments, each of the rails may include a first rail 211-1 including a first arc surface 221 having a first radius of curvature r1 and a second rail 211-2 including a second arc surface 222 having a second radius of curvature r2 greater than the first radius of curvature r1, and each of the support portions may include a first support portion 232-1 received in the first rail 211-1 and a second support portion 232-2 received in the second rail 211-2.

In various embodiments, the first radius of curvature may range from 0.7 to 0.9, and the second radius of curvature may range from 1.1 to 1.3.

In various embodiments, the display 120 may include a first area 121 and a second area 122 formed to be flat and a folding area 123 formed between the first area 121 and the second area 122 and formed to be flat or curved. The electronic device 100 may include a flat state in which the folding area 123 is substantially flat and a folded state in which the folding area 123 is substantially curved. Each of the moving parts 230 may be formed such that in the flat state, the second support portion 232-2 makes contact with the second arc surface 222 and the first support portion 232-1 is spaced apart from the first arc surface 221.

In various embodiments, the folded state may include a fully-folded state in which part of a periphery P1 of the first housing 111 meets part of a periphery P2 of the second housing 112, and the moving part 230 may be formed such that in the fully-folded state, the second support portion 232-2 is spaced apart from the second arc surface 222 and the first support portion 232-1 makes contact with the first arc surface 221.

In various embodiments, a movement of the moving part 230 may include a first operation in which the moving part 230 moves while the second support portion 232-2 makes contact with the second arc surface 222 and a second operation in which the moving part 230 moves while the first support portion 232-1 makes contact with the first arc surface 221, and the moving part 230 may substantially sequentially perform the first operation and the second operation when the electronic device 100 moves from the flat state to the fully-folded state.

In various embodiments, the first operation may include first rotation about an axis C2 parallel to the folding axis F and a first linear movement by which a distance L1 or L2 from the folding axis F is changed. The second operation may include second rotation about an axis C1 parallel to the folding axis F and a second linear movement by which a distance L3 or L4 from the folding axis F is changed. A rotation angle θ1 of the first rotation may range from 0 degrees to 37 degrees, and a rotation angle θ1 of the second rotation may range from 33 degrees to 90 degrees.

In various embodiments, a displacement L2–L1 of the first linear movement may be greater than a displacement L4–L3 of the second linear movement.

In various embodiments, the moving parts 230 may include connecting portions 233 extending from the cover portions 231, the connecting portions 233 may include guide protrusions 234 protruding in a direction parallel to the folding axis F, and the guide parts 250 may include guide grooves 253 in which the guide protrusions 234 are received.

In various embodiments, the display may include a first area and a second area formed to be flat and a folding area formed to be flat or curved between the first area and the second area. The electronic device may include a flat state in which the folding area is substantially flat and a folded state in which the folding area is substantially curved. The folded state may include a fully-folded state in which part of a periphery P1 of the first housing 111 meets part of a periphery P2 of the second housing 112. The guide grooves 253 may include first end portions 253-1 relatively close to the folding axis F and second end portions 253-2 relatively far away from the folding axis F. In the flat state, the guide protrusions 234 may be located in the first end portions 253-1, and in the fully-folded state, the guide protrusions 234 may be spaced apart from the second end portions 253-2 at predetermined intervals d.

In various embodiments, the guide parts 250 may include elastic members 258 that apply elastic forces to the moving parts 230, and the elastic members 258 may be formed to be stretched when the first housing 111 and the second housing 112 are unfolded and to be compressed when the first housing 111 and the second housing 112 are folded.

According to embodiments of the disclosure, an electronic device may include a housing structure including a first housing 111, a second housing 112, and a hinge housing 119, a hinge structure 150 that is at least partially disposed in the hinge housing 119 and that connects the first housing 111 and the second housing 112 to allow the first housing 111 and the second housing 112 to be folded or unfolded, with a folding axis F therebetween, a display 120 that extends from the first housing 111 to the second housing 112 across the hinge housing 119 and that includes a first area 121 formed to be flat and disposed in at least part of the first housing 111, a second area 122 formed to be flat and disposed in at least part of the second housing 112, and a folding area 123 formed to be flat or curved and disposed in at least part of the hinge housing 119, and a protective structure 200 located at an edge of the hinge housing that faces a direction of the folding axis, the protective structure 200 including moving parts 230 including cover portions 231 that cover at least parts of an edge P3 or P4 of the folding area 123 of the display 120 that faces a direction of the folding axis F, a fixed part 210 that is at least partially disposed in the hinge housing 119 and that supports movements of the moving parts 230, and guide parts 250 that are disposed in the first housing 111 and the second housing 112, respectively, and that guide the movements of the moving parts 230. The electronic device 100 may include a flat state in which the folding area 123 is flat and a folded state in which the folding area 123 is curved, and the moving parts 230 may be configured to be movable such that the cover portions 231 move away from the folding axis F and move toward a surface of the folding area 123 when the electronic device 100 moves from the flat state to the folded state.

In various embodiments, the first housing 111 and the second housing 112 may include a first edge P1 and a second edge P2, respectively, which are parallel to the folding axis. The folded state may include a fully-folded state in which the first edge P1 meets the second edge P2. Each of the moving parts 230 may include a first support portion 232-1 and a second support portion 232-2 protruding from the cover portion 231 of the moving part 230 toward the fixed part. The fixed part 210 may include a first rail 211-1 in which at least part of the first support portion 232-1 is received and a second rail 211-2 in which at least part of the second support portion 232-2 is received. The moving part 230 may be formed such that in the flat state, the second portion support 232-2 makes contact with the second rail 211-2 and in the fully-folded state, the first support portion 232-1 makes contact with the first rail 211-1.

In various embodiments, the moving part 230 may be configured to perform rotation about an axis C1 or C2 parallel to the folding axis F and a linear movement by which a displacement from the folding axis F is changed. The second rail 211-2 may have a greater radius of curvature than the first rail 211-1. In a state of making contact with the second rail 211-2, the moving part 230 may have a smaller rotation angle and a greater linear displacement than in a state of making contact with the first rail 211-1.

According to the embodiments of the disclosure, the electronic device may include the protective structures covering parts of the edges of the folding area of the flexible display, thereby preventing damage to the flexible display. Furthermore, the protective structures may not collide with the flexible display that deforms in a folding operation and an unfolding operation.

In addition, the disclosure may provide various effects that are directly or indirectly recognized.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory) in the form of a program module. The instruction, when executed by a processor (e.g., the processor), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing structure including a first housing, a second housing, and a hinge housing;
   a hinge at least partially disposed in the hinge housing and configured to connect at least part of the first housing and at least part of the second housing to allow the first housing and the second housing to be folded or unfolded, with a folding axis therebetween;
   a display extending from the first housing to the second housing across the hinge housing, the display including a surface defining at least a portion of a front surface of the electronic device when the first housing and the second housing are unfolded; and
   a protective structure disposed at an edge of the hinge housing,
   wherein the protective structure includes a fixed part disposed in the hinge housing, guide parts disposed in the first housing and the second housing, respectively, and moving parts including cover portions configured to cover at least parts of a periphery of the surface of the display, and
   wherein the moving parts are configured to be movable relative to the guide parts and the fixed part such that a gap between the surface of the display and the cover portions changes according to folding of the first housing and the second housing along the folding axis.

2. The electronic device of claim 1, wherein the display includes a first area and a second area formed to be flat and a folding area formed between the first area and the second area and formed to be flat or curved, wherein the electronic device includes a flat state in which the folding area is substantially flat and a folded state in which the folding area is substantially curved, and wherein the cover portions of the moving parts are spaced apart from the surface of the display with a first gap therebetween in the flat state and are spaced apart from the surface of the display with a second gap therebetween in the folded state, the second gap being smaller than the first gap.

3. The electronic device of claim 2, wherein the moving parts are configured to be movable so as to be spaced apart from the folding axis by a first distance in the flat state and by a second distance greater than the first distance in the folded state.

4. The electronic device of claim 1, further comprising:
decorative members formed to cover at least parts of the periphery of the display, wherein the moving parts are configured to be movable such that the cover portions are located to form a substantially continuous plane with the decorative members, or the cover portions are located closer to the surface of the display than the decorative members.

5. The electronic device of claim 4, wherein receiving spaces are defined between the decorative members and the surface of the display, and wherein the cover portions are configured to be movable such that at least parts thereof are received in the receiving spaces.

6. The electronic device of claim 2, wherein the moving parts are configured such that the cover portions move toward the surface of the display and move away from the folding axis when the electronic device moves from the flat state to the folded state, and wherein the moving parts are configured such that the cover portions move away from the surface of the display and move toward the folding axis when the electronic device moves from the folded state to the flat state.

7. The electronic device of claim 1, wherein the fixed part includes rails, wherein the moving parts include support portions protruding from the cover portions toward the fixed part, and at least parts of the support portions make contact with surfaces of the rails, and wherein the moving parts are configured to rotate relative to the fixed part by predetermined angles and linearly move such that distances from the folding axis are changed, when the first housing and the second housing are folded or unfolded.

8. The electronic device of claim 7, wherein each of the rails includes a first rail including a first arc surface having a first radius of curvature and a second rail including a second arc surface having a second radius of curvature greater than the first radius of curvature, and wherein each of the support portions includes a first support portion received in the first rail and a second support portion received in the second rail.

9. The electronic device of claim 8, wherein the first radius of curvature is in a range from 0.7 to 0.9, and wherein the second radius of curvature is in a range from 1.1 to 1.3.

10. The electronic device of claim 8, wherein the display includes a first area and a second area formed to be flat and a folding area formed between the first area and the second area and formed to be flat or curved, wherein the electronic device includes a flat state in which the folding area is substantially flat and a folded state in which the folding area is substantially curved, and wherein each of the moving parts is formed such that in the flat state, the second support portion makes contact with the second arc surface and the first support portion is spaced apart from the first arc surface.

11. The electronic device of claim 10, wherein the folded state includes a fully-folded state in which part of a periphery of the first housing meets part of a periphery of the second housing, and wherein the moving part is formed such that in the fully-folded state, the second support portion is spaced apart from the second arc surface and the first support portion makes contact with the first arc surface.

12. The electronic device of claim 11, wherein a movement of the moving part includes a first operation in which the moving part moves while the second support portion makes contact with the second arc surface and a second operation in which the moving part moves while the first support portion makes contact with the first arc surface, and wherein the moving part substantially sequentially performs the first operation and the second operation when the electronic device moves from the flat state to the fully-folded state.

13. The electronic device of claim 12, wherein the first operation includes first rotation about an axis parallel to the folding axis and a first linear movement by which a distance from the folding axis is changed, wherein the second operation includes second rotation about an axis parallel to the folding axis and a second linear movement by which a distance from the folding axis is changed, wherein a rotation angle of the first rotation ranges from 0 degrees to 37 degrees, and wherein a rotation angle of the second rotation is in a range from 33 degrees to 90 degrees.

14. The electronic device of claim 13, wherein a displacement of the first linear movement is greater than a displacement of the second linear movement.

15. The electronic device of claim 1, wherein the moving parts include connecting portions extending from the cover portions, wherein the connecting portions include guide protrusions protruding in a direction parallel to the folding axis, and wherein the guide parts include guide grooves in which the guide protrusions are received.

16. The electronic device of claim 15, wherein the display includes a first area and a second area formed to be flat and a folding area formed to be flat or curved between the first area and the second area, wherein the electronic device includes a flat state in which the folding area is substantially flat and a folded state in which the folding area is substantially curved, wherein the folded state includes a fully-folded state in which part of a periphery of the first housing meets part of a periphery of the second housing, wherein the guide grooves include first end portions relatively close to the folding axis and second end portions relatively far away from the folding axis, and wherein in the flat state, the guide protrusions are located in the first end portions, and in the fully-folded state, the guide protrusions are spaced apart from the second end portions at predetermined intervals.

17. The electronic device of claim 1, wherein the guide parts include elastic members configured to apply elastic forces to the moving parts, and wherein the elastic members are stretched when the first housing and the second housing are unfolded and compressed when the first housing and the second housing are folded.

18. An electronic device comprising:

a housing structure including a first housing, a second housing, and a hinge housing;

a hinge at least partially disposed in the hinge housing and configured to connect the first housing and the second housing to allow the first housing and the second housing to be folded or unfolded, with a folding axis therebetween;

a display extending from the first housing to the second housing across the hinge housing, the display including a surface defining a front surface of the electronic device when the first housing and the second housing are unfolded, the surface including a first area formed to be flat and disposed in at least part of the first housing, a second area formed to be flat and disposed in at least part of the second housing, and a folding area formed to be flat or curved and disposed in at least part of the hinge housing; and a protective structure located at an edge of the hinge housing, the protective structure including moving parts including cover portions configured to cover at least parts of an edge of the surface of the display in the folding area of the display, a fixed part at least partially disposed in the hinge housing and configured to support movements of the moving parts, and guide parts disposed in the first housing and the second housing, respectively, and configured to guide the movements of the moving parts, wherein the electronic device includes a flat state in which the folding area is flat and a folded state in which the folding area is curved, and wherein the moving parts are configured to be movable such that the cover portions move away from the folding axis and move toward a surface of the folding area when the electronic device moves from the flat state to the folded state.

19. The electronic device of claim 18, wherein the first housing and the second housing include a first edge and a second edge, respectively, which are parallel to the folding axis, wherein the folded state includes a fully-folded state in which the first edge meets the second edge, wherein each of the moving parts includes a first support portion and a second support portion protruding from the cover portion of the moving part toward the fixed part, wherein the fixed part includes a first rail in which at least part of the first support portion is received and a second rail in which at least part of the second support portion is received, and wherein the moving part is formed such that in the flat state, the second support portion makes contact with the second rail and in the fully-folded state, the first support portion makes contact with the first rail.

20. The electronic device of claim 19, wherein the moving part is configured to perform rotation about an axis parallel to the folding axis and a linear movement by which a displacement from the folding axis is changed, wherein the second rail has a radius of curvature greater than a radius of curvature of the first rail, and wherein, in a state of making contact with the second rail, the moving part has a smaller rotation angle and a greater linear displacement than in a state of making contact with the first rail.

\* \* \* \* \*